US012307782B2

(12) United States Patent
Hashimoto

(10) Patent No.: US 12,307,782 B2
(45) Date of Patent: May 20, 2025

(54) OBJECT INFORMATION OBTAINING METHOD AND SYSTEM FOR IMPLEMENTING

(71) Applicant: Woven by Toyota, Inc., Tokyo (JP)

(72) Inventor: Daisuke Hashimoto, Chofu (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 270 days.

(21) Appl. No.: 17/707,874

(22) Filed: Mar. 29, 2022

(65) Prior Publication Data

US 2023/0316769 A1 Oct. 5, 2023

(51) Int. Cl.
*G06V 20/58* (2022.01)
*B60W 40/02* (2006.01)
(Continued)

(52) U.S. Cl.
CPC ............ *G06V 20/58* (2022.01); *B60W 40/02* (2013.01); *B60W 40/08* (2013.01); *B60W 50/10* (2013.01); *B60W 50/14* (2013.01); *G06T 11/00* (2013.01); *G06V 10/25* (2022.01); *G06V 10/764* (2022.01); *G06V 20/59* (2022.01); *G06V 40/18* (2022.01); *B60W 2040/0809* (2013.01); *B60W 2050/146* (2013.01); *B60W 2420/403* (2013.01);
(Continued)

(58) Field of Classification Search
CPC ........... B60W 2540/225; B60W 40/08; B60W 2420/403; G06T 2210/22; G06T 2210/12; G06V 10/25; G06V 10/255; G06V 10/243; G06V 10/242; G06V 10/764; G06V 20/20; G06V 20/58; G06V 20/588; G06V 20/59; G06V 20/597; G06V 2201/07; G06V 40/18; G06V 40/19; G06V 40/193; G06V 40/197; G06V 20/56; G06V 20/582; G06V 20/584; G06V 20/586; G06V 40/20; B60K 2370/194; B60K 2370/736; B60K 2370/739; B60K 2370/741; B60R 1/00; B60R 1/22; B60R 1/23; B60R 1/24; B60R 1/25; B60R 1/26; B60R 1/28; G06F 3/017; G06F 3/012; G06F 3/013
USPC ....................................................... 348/148
See application file for complete search history.

(56) References Cited

U.S. PATENT DOCUMENTS 9,915,547 B2 3/2018 Yuan
2008/0077321 A1 3/2008 Widodo et al.
(Continued)

*Primary Examiner* — Nathnael Aynalem
(74) *Attorney, Agent, or Firm* — HAUPTMAN HAM, LLP

(57) ABSTRACT

A method of obtaining object information includes receiving a request initiation from an occupant of a vehicle. The method includes receiving a request from the occupant. The method includes determining a content of the request from the occupant. The method further includes detecting a gaze location of the occupant. The method includes receiving information related to an environment surrounding the vehicle based on data collected by a sensor attached to the vehicle. The method includes identifying a region of interest (ROI) outside of the vehicle based on the detected gaze location and the information related to the environment surrounding the vehicle. The method includes generating log data based on the ROI and the content of the request. The method includes transmitting the log data to an external device. The method includes receiving information related to an object within the ROI, wherein the information satisfies the content of the request.

20 Claims, 11 Drawing Sheets

(51) Int. Cl.
*B60W 40/08* (2012.01)
*B60W 50/10* (2012.01)
*B60W 50/14* (2020.01)
*G06T 11/00* (2006.01)
*G06V 10/25* (2022.01)
*G06V 10/764* (2022.01)
*G06V 20/59* (2022.01)
*G06V 40/18* (2022.01)

(52) U.S. Cl.
CPC .... *B60W 2540/225* (2020.02); *G06T 2200/24* (2013.01); *G06T 2210/22* (2013.01)

(56) References Cited

U.S. PATENT DOCUMENTS

| | | | |
|---|---|---|---|
| 2013/0076883 A1* | 3/2013 | Madau | B60K 35/10 |
| | | | 348/78 |
| 2014/0078282 A1 | 3/2014 | Aoki et al. | |
| 2015/0193664 A1* | 7/2015 | Marti | G08B 21/06 |
| | | | 382/103 |
| 2015/0235398 A1* | 8/2015 | Kim | G06T 7/194 |
| | | | 345/633 |
| 2016/0142613 A1* | 5/2016 | Brav | H04N 23/951 |
| | | | 348/211.3 |
| 2017/0126907 A1* | 5/2017 | Tamura | H04N 23/61 |
| 2017/0174227 A1* | 6/2017 | Tatourian | B60R 1/00 |
| 2019/0246036 A1* | 8/2019 | Wu | G06F 3/0484 |
| 2021/0293567 A1 | 9/2021 | Bill et al. | |
| 2021/0397859 A1* | 12/2021 | Arora | G06V 40/19 |
| 2022/0247976 A1* | 8/2022 | Nakagawa | G06V 20/62 |

\* cited by examiner

OBJECT INFORMATION OBTAINING METHOD AND SYSTEM FOR IMPLEMENTING

RELATED APPLICATIONS

This application is related to U.S. application Ser. No. 17/497,846, filed Oct. 8, 2021, which is hereby incorporated by reference in its entirety.

BACKGROUND

Occupants of vehicles see objects of interest out of windows of the vehicle. In some instances, the occupants wish to identify the object or learn more information about the object. In some instances, the occupant will capture an image of the object using a mobile device, such as a smartphone, and then perform a search on the Internet to identify the object or learn more about the object. In some instances, movement of the vehicle makes capturing the image of the object more difficult. In addition, in some instances, obstructing objects pass between the vehicle and the object that inhibit the capturing of an image of the object. In some instances, a driver is unable to safely remove their hands from the steering wheel to capture the image using the mobile device.

In some approaches, the occupant looks at a map to attempt to identify the object. The occupant is then able to search the Internet to determine whether the object identified using the map is accurate and, if so, more information about the object. Identifying the object using the map is done using the occupants best estimate about the location of the object relative to other known landmarks or objects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
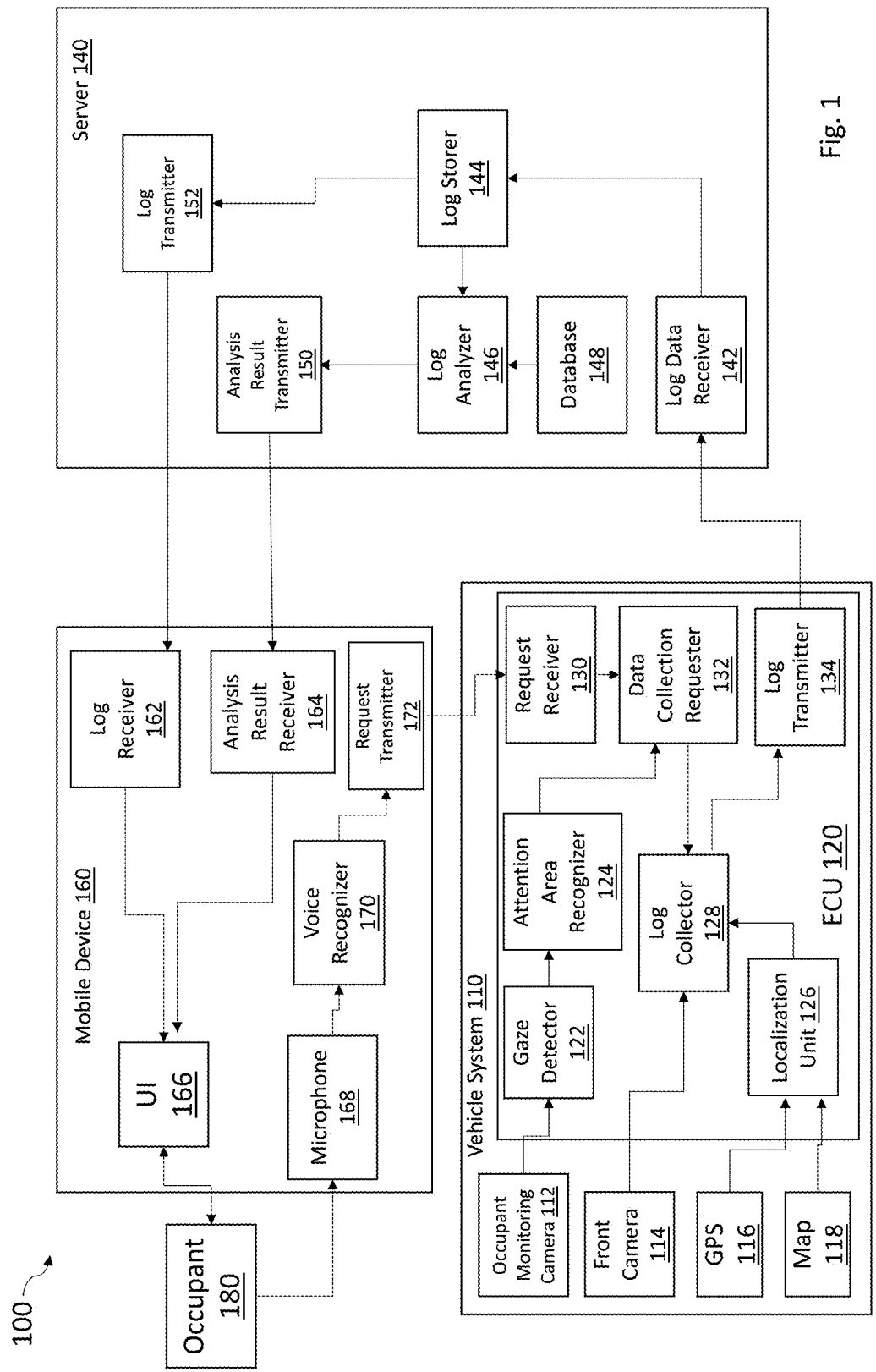
FIG. 1 is a block diagram of an object identification system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Occupants within a moving vehicle often have difficulty with identifying objects of interest. In some instances, the occupant is unable to accurately identify the object based on either a map or a captured image. In some instances, the occupant, such as a driver, is unable to use a map or an image capturing device, such as a smartphone, to attempt to identify the object of interest. In order to assist the occupant in accurately identifying an object of interest, the object identification method of this description utilizes request initiation commands in combination of gaze data and vehicle sensor data to identify the object. In some embodiments, information about the identified object is also provided, such as hours of operation, historical information, etc.

By utilizing gaze data, the method is able to determine a direction that the occupant is looking. The gaze data is combined with map data and/or vehicle sensor data to determine what object the occupant is observing at the time a request is initiated. Utilizing a request initiation helps to reduce processing load and data transferred between the vehicle and an external device such as a server. In some embodiments, the request initiation includes a key word received via an audio signal from the occupant. In some embodiments, the request initiation includes detecting a predetermined gesture from the occupant. In some embodiments, the request initiation includes receiving an input from a user interface (UI) accessible by the occupant.

Using the vehicle sensors and/or map data stored within the vehicle help to capture information related to the environment surrounding the vehicle without using a separate device, such as a smartphone, and without the occupant, such as the driver, removing their hands from a steering wheel. This helps to reduce distractions to the occupant and/or driver and allows occupants to identify the object without handling of an external device. Use of vehicle sensor and map data also helps to increase object identification accuracy in situations where objects, such as other vehicles, are obstructing the view of the object of interest; or when the object is initially visible and later obstructed by the time the external device is in a state ready to use.

In some embodiments, the object is displayed on a vehicle UI to help confirm the object identification. Once the object of interest is identified, then the occupant is able to request additional information related to the identified object. For example, in some embodiments, the occupant is able to request directions to the identified object, hours of operation for the identified object, historical information related to the identified object, or other suitable information.

FIG. 1 is a block diagram of an object identification system 100, in accordance with some embodiments. The description of the object identification system 100 focuses on an automobile controlled by a driver. However, one of ordinary skill in the art would recognize that other vehicles and operators are within the scope of this description, such as a train operated by an engineer or other mobile vehicles. The object identification system 100 includes a vehicle system 110 configured to capture information about an occupant of a vehicle and to generate gaze data. The vehicle system 110 also captured request initiation signals and occupant requests. The object identification system 100 further includes a server 140 configured to receive the generated gaze data as well as information collected from sensors of the vehicle as log data. The object identification system 100 further includes a mobile device 160 accessible by the occupant of the vehicle associated with the occupant request. In some embodiments, some or all of the functionality of the mobile device 160 is incorporated into the vehicle system 110. Incorporating the functionality of the mobile device 160 into the vehicle system 110 permits the occupant to utilize the object identification system 100 even if the occupant does not have access to a mobile device or if a battery of the mobile device is not sufficiently charged to permit use of the mobile device.

The vehicle system 110 includes an electronic control unit (ECU) 120 configured to receive data from an occupant monitoring camera 112, a front camera 114, a global positioning system (GPS) 116 and a map 118. The ECU 120 includes a gaze detector 122 configured to receive data from the occupant monitoring camera 112 and detect a gaze direction and/or a gaze depth based on the received data. The ECU 120 further includes an attention area recognizer 124 configured to determine a position of a gaze of the occupant. The ECU 120 further includes a localization unit 126 configured to receive data from the GPS 116 and the map 118 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector and the jerk vector include angle vector. In some embodiments, the state of the vehicle also refers to whether an engine or motor of the vehicle is running. The ECU 120 further includes a log collector 128 configured to receive information from the front camera 114, the localization unit 126 and a data collection requester 132 and to combine the data collection request from the occupant with the corresponding sensor data from the vehicle system 110 in order to compile log data usable by the server 140 to identify the object of interest. The ECU 120 further includes a request receiver 130 configured to receive a data request from the mobile device 160. In some embodiments where the functionality of the mobile device 160 is integrated with the vehicle system 110, the request receiver 130 is omitted. The ECU 120 further includes a data collection requester 132 configured to receive gaze data and area of interest information from the attention area recognizer 124 and occupant request information from the request receiver 130. The data collection requester 132 is configured to correlate the received information to generate instructions for the log collector 128 to collect data relevant to the occupant request information from sensors, such as front camera 114, of the vehicle. The ECU 120 further includes a log transmitter 134 configured to receive the log data from the log collector 128 and transmit the log data to the server 140.

The occupant monitoring camera 112 is configured to capture images of a driver, or other occupant, of the viewing vehicle. The occupant monitoring camera 112 is connected to the vehicle. In some embodiments, the occupant monitoring camera 112 includes a visible light camera. In some embodiments, the occupant monitoring camera 112 includes an infrared (IR) camera or another suitable sensor. In some embodiments, the occupant monitoring camera 112 is movable relative to the vehicle in order to capture images of at least one eye of an occupant that are different sizes. While capturing images of both eyes of the occupant is preferred, some occupants have only a single eye, and in some instances where a head of the occupant is turned away from the occupant monitoring camera 112, only one of the occupant's eyes is capturable by the occupant monitoring camera 112. In some embodiments, the occupant monitoring camera 112 is adjusted automatically. In some embodiments, the occupant monitoring camera 112 is manually adjustable. In some embodiments, the captured image includes at least one eye of the occupant. In some embodiments, the captured image includes additional information about the occupant, such as approximate height, approximate weight, hair length, hair color, clothing or other suitable information. In some embodiments, the occupant monitoring camera 112 includes multiple image capturing devices for capturing images of different regions of the occupant. In some embodiments, occupant monitoring cameras 112 are located at different locations within the vehicle. For example, in some embodiments, a first occupant monitoring camera 112 is located proximate a rear-view mirror in a central region of the vehicle; and a second occupant monitoring camera 112 is located proximate a driver-side door. One of ordinary skill in the art would recognize that other locations for the occupant monitoring camera 112, which do not interfere with operation of the vehicle, are within the scope of this disclosure. In some embodiments, the data from the occupant monitoring camera 112 includes a timestamp or other metadata to help with synchronization with other data.

One of ordinary skill in the art would understand that in some embodiments the vehicle system 110 includes additional cameras for monitoring multiple occupants. Each of the additional cameras are similar to the occupant monitoring camera 112 described above. For example, in some embodiments, one or more monitoring cameras are positioned in the vehicle for capturing images of at least one eye of a front-seat passenger. In some embodiments, one or more monitoring cameras are positioned in the vehicle for capturing images of at least one eye of a rear-seat passenger. In some embodiments, the additional cameras are only activated in response to the vehicle detecting a corresponding front-seat passenger or rear-seat passenger. In some embodiments, an operator of the vehicle is able to selectively de-activate the additional cameras. In embodiments including additional cameras, the captured images are still sent to the gaze detector 122; and the gaze detector 122 is able to generate a gaze result for each of the monitored occupants of the vehicle.

The front camera 114 is configured to capture images of an environment surrounding the vehicle. In some embodiments, the front camera 114 includes a visible light camera, an IR camera. In some embodiments, the front camera 114 is replaced with or is further accompanied by a light detection and ranging (LiDAR) sensor, a radio detection and ranging (RADAR) sensor, a sound navigation and ranging (SONAR) sensor or another suitable sensor. In some embodiments, the front camera 114 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of determining objects being viewed by the occupants of the vehicle. For example, in some embodiments, additional cameras are located on a back side of the vehicle in order to detect a larger portion of the environment to a rear of the vehicle. This information helps to capture additional objects that vehicle occupants other than the driver are able to view out of rear window. The front camera 114 is also able to capture images for determining whether any obstructions, such as medians or guard rails, are present between a location of an object and the occupants of the viewing vehicle. In some embodiments, the data from the front camera 114 includes a timestamp or other metadata in order to help synchronize the data from the front camera 114 with the data from the occupant monitoring camera 112.

The GPS 116 is configured to determine a location of the vehicle. Knowing the location of the viewing vehicle helps to relate the object and the direction that drew the attention of the occupants with the objects and areas that are related to determined locations on the map 118. Knowing the heading of the vehicle helps to predict which direction an occupant of the vehicle is looking in order to assist with generation of gaze data. Knowing a speed of the viewing vehicle helps to determine how long an occupant of the vehicle had an opportunity to view an object of interest. For example, in some embodiments, by the time the occupant initiates a request, the vehicle has moved past the object of interest or a position of the vehicle relative to the object of interest has changed. As a result, knowing the location of the vehicle at different times helps with correlating occupant requests with objects of interest.

The map 118 includes information related to the roadway and known objects along the roadway. In some embodiments, the map 118 is usable in conjunction with the GPS 116 to determine a location and a heading of the vehicle. In some embodiments, the map 118 is received from an external device, such as the server 140. In some embodiments, the map 118 is periodically updated based on information from the front camera 114 and/or the GPS 116. In some embodiments, the map 118 is periodically updated based on information received from the external device. In some embodiments, the map 118 is generated from sensor data by simultaneous localization and mapping (SLAM) algorithm.

The following description will focus primarily on analysis of information related to the driver for the sake of brevity. One of ordinary skill in the art would understand that the description is applicable to other occupants, such as front-seat passengers or rear-seat passengers, of the vehicle as well.

The gaze detector 122 is configured to receive data from the driver monitoring camera 112 and generate a detected gaze result. The detected gaze result includes a direction that the eyes of the driver are looking. In some embodiments, the direction includes an azimuth angle and an elevation angle. Including azimuth angle and elevation angle allows a determination of a direction that the driver is looking both parallel to a horizon and perpendicular to the horizon. In some embodiments, the detected gaze result further includes depth information. Depth information is an estimated distance from the driver that visual axes of the driver's eyes converge. Including depth information allows a determination of a distance between the driver and an object on which the driver is focusing a gaze. Combining depth information along with azimuth angle and elevation angle increases a precision of the detected gaze result. In some embodiments where the captured image includes only a single eye of the driver, the determining depth information is difficult, so only azimuth angle and elevation angle are determined by the gaze detector 122. In some embodiments, the gaze detector 122 is further configured to receive data from the front camera 114 and to associate the detected gaze with a pixel location of an image from the front camera 114 based on the azimuth angle and elevation angle.

In some embodiments, the gaze detector 122 is not attached to the vehicle. In some embodiments, the gaze detector 122 is attached to the occupant of the viewing vehicle. For example, in some embodiments, the gaze detector 122 includes smart glasses, another piece of smart clothing or other such device that is capable of determining gaze information of a wearer. In some embodiments that utilize smart glasses, gaze data is able to be collected from pedestrians, people riding bicycles or other people that are not in a vehicle. The object identification system 100 is able to utilize this gaze data in order to help identify objects of interest. In embodiments that include the user of the gaze detector 122 not attached to the vehicle, the front camera 114 and the localization unit 126 are still used in combination with the gaze detector 122.

The attention area recognizer 124 is configured to receive gaze data from the gaze detector 122 and further refine the gaze data to identify an area of a visible field of the occupant that is a focus of the occupant. Based on the received gaze data, the attention area recognizer 124 identifies a position relative to the vehicle where the occupant's attention is directed. In some embodiments, the attention area recognizer 124 is further configured to receive information from the front camera 114 and identifies pixel regions from captured images of the front camera 114 where the attention of the occupant is directed. The attention area recognizer 124 helps to reduce an amount of data in the log data collected by the log collector 128 to reduce processing load on the ECU 120.

The localization unit 126 is configured to receive information from the GPS 116 and the map 118 and determining a location of the vehicle in the world coordinate system or a location of the vehicle relative to the objects on the map 118 and known objects. In some embodiments, the localization unit 126 is usable to determine a heading and a speed of the vehicle. The localization unit 126 is also configured to determine state information for the vehicle. In some embodiments, the state information includes speed of the vehicle. In some embodiments, the state information includes velocity vector of the vehicle. In some embodiments, the state information includes heading of the vehicle. In some embodiments, the state information includes acceleration vector of the vehicle. In some embodiments, the state information includes jerk vector of the vehicle. In some embodiments, the state information includes whether an engine or motor of the vehicle is running. In some embodiments, the state information includes other status information related to the vehicle, such as operation of wind shield wipers, etc.

The log collector 128 is configured to receive an image from the front camera 114, state information from the localization unit 126 and occupant request information from the data collection requester 132. The log collector 128 is configured to correlate the received data to determine what portion of the image from the front camera 114 was being observed by the occupant at the time that the occupant request was initiated. The log collector 128 is also configured to determine what information is being sought by the occupant, such as object identification, directions to the object, or other suitable information. The log collector 128 determines the portion of the image captured by the front camera 114 based on the gaze data analyzed by the attention area analyzer 124 and the data collection requester 132. Based on the analyzed gaze data, the log collector 128 is able to crop the image from the front camera 114 in order to reduce an amount of data to be transmitted to the server for analysis. The log collector 128 uses the state information from the localization unit 126 to complement the analyzed gaze data to help with precision in the image cropping.

The log collector 128 generates log data based on the received and correlated data, such as the cropped image and requested data. The log collector 128 also associates timestamp information with the log data in order to assist with synchronization of the collected data and for queue priority within the server 150. In some embodiments, the log collector 128 generates the log data to further include world coordinates associated with the cropped image. In some embodiments, the log collector 128 generates the log data to further include a map location associated with the cropped image. In some embodiments, the log collector 128 includes additional information to assist in increasing accuracy of responding to the occupant request.

While the above description relates to generating log data based on an image from the front camera 114, one of ordinary skill in the art would understand that the log collector 128 is not limited solely to generating log data based on images. In some embodiments, the log collector 128 is configured to generate log data based on information from other sensors attached to the vehicle, such as RADAR, LiDAR, or other suitable sensors. In some embodiments, the log collector 128 can generate log data based on point cloud data received from LiDAR instead of the image data. One of ordinary skill in the art would recognize that point cloud data includes a set of data points in space that are usable to represent a three-dimensional shape or object based on a distance of each point from the detector. In some embodiments where the occupant is wearing smart glasses, the log collector 128 is further configured to generate the log data based on information received from the smart glasses.

The request receiver 130 is configured to receive a request from the mobile device 160. In some embodiments where the functionality of the mobile device 160 is incorporated into the vehicle system 110, the request receiver 130 is omitted and the request is transferred directly to the data collection requester 132. In some embodiments, the request receiver 130 is configured to receive the request wirelessly. In some embodiments, the request receiver 130 is configured to receive the request via a wired connection. In some embodiments, the request receiver 130 is configured to receive a request initiation prior to receiving the request. In some embodiments, in response to receiving a request initiation, the request receiver 130 is configured to notify the data collection requester to initiate data collection at the log collector 128 to help ensure that information from the vehicle sensors, such as the front camera 114, is stored for generation of log data. In some embodiments, the request receiver 130 is further configured to receive the request including identification information for the occupant making the request and timestamp information for when the request was made. In some embodiments, the request receiver 130 is configured to receive information related to an identity of the occupant making the request.

The data collection requester 132 is configured to correlate the occupant request with region of interest (ROI) information from the attention area analyzer 124. The data collection requester 132 is configured to convert the occupant request and ROI information into instructions usable by the log collector 128 to collect information for satisfying the occupant request. In some embodiments, the data collection requester 132 is configured to determine what sensors are available to capture information related to a certain region of the environment surrounding the vehicle. In some embodiments, the data collection requester 132 is configured to identify what types of sensors the log collector 128 should use to satisfy the occupant request. The data collection requester 132 is further configured to identify a timestamp of the occupant request to allow the log collector 128 to accurately collect data from the relevant sensors on the vehicle.

The log transmitter 134 is configured to receive log data from the log collector 128 and transmit the log data to the server 140. In some embodiments, the log transmitter 134 is configured to transmit the log data wirelessly. In some embodiments, the log transmitter 134 is configured to transmit the log data via a wired connection. In some embodiments, the log transmitter 134 is configured to transmit the log data to the mobile device 160, which in turn is configured to transmit the log data to the server 140. In some embodiments, the log transmitter 134 is configured to transmit the log data to the mobile device 160 using Bluetooth® or another suitable wireless technology. In some embodiments, the ECU 120 is configured to determine whether the data transfer rate from the mobile device 160 to the server 140 is higher than a transfer rate from the log transmitter 134 to the server 140. In response to a determination that the data transfer rate from the mobile device 160 to the sever 140 is higher, the log transmitter 134 is configured to transmit the log data to the mobile device 160 to be transmitted to the server 140. In response to a determination that the data transfer rate from the mobile device 160 to the server 140 is not higher, the log transmitter 134 is configured to transmit the log data to the server 140 from the vehicle system 110 directly without transferring the log data to the mobile device 160.

In some embodiments, the vehicle system 110 further includes a memory configured to store sensor data from sensors attached to the vehicle. In some embodiments, the memory is further configured to store information associated with previous occupant requests. In some embodiments, in response to the data collection requester 132 determining that the occupant request matches a previous occupant request, the data collection requester 132 is configured to provide results from the matching previous occupant request to the occupant 180. In some embodiment, the previous requests is stored as cache data. One of ordinary skill in the art would understand caching as using hardware or software to store data so that future requests for that data are able to be served faster.

The server 140 includes a log data receiver 142 configured to receive the log data from the log transmitter 134. In some embodiments, the log data receiver 142 is configured to receive the log data from the mobile device 160. The server 140 further includes a log storer 144 configured to store the received log data. The server 140 further includes a log analyzer 146 configured to receive the log data from the log storer 144 and information from a database 148 to identify an object of interest and/or provide information related to the object of interest. The server 140 further includes a database 148 configured to store information about objects. The server 140 further includes an analysis result transmitter 150 configured to transmit the results of the log analyzer 146 to the mobile device 160. The server 140 further includes a log transmitter 152 configured to transmit log identification information to the mobile device 160.

The log data receiver 142 is configured to receive the log data from the log transmitter 134. In some embodiments, the log data receiver 142 is configured to receive the log data from the mobile device 160. In some embodiments, the log data receiver 142 is configured to receive the log data wirelessly. In some embodiments, the log data receiver 142 is configured to receive the log data via a wired connection. In some embodiments, the log data receiver 142 is configured to attach a timestamp for a time that the log data was received to the log data.

The log storer 144 is configured to store the received log data for analysis. In some embodiments, the log storer 144 includes a solid-state memory device. In some embodiments, the log storer 144 includes a dynamic random-access memory (DRAM). In some embodiments, the log storer 144 includes a non-volatile memory device. In some embodiments, the log storer 144 includes cloud-based storage or another suitable storage structure. In some embodiments, the log storer 144 is configured to store the log data in a queue based on priority. In some embodiments, the priority is based on a timestamp of when the server 140 received the log data. In some embodiments, the priority is based on a timestamp of when the occupant request was received. In some embodiments, the priority is based on a size of the log data. In some embodiments, the priority is based on an identity of the of the occupant 180. For example, in some embodiments, the occupant has an account with a service offered on the server 140 for prioritizing fulfillment of occupant requests. In some embodiments, other criteria are used to determine a priority of the log data in the queue. In some embodiments, log data is removed from the log storer 144 following analysis of the log data by the log analyzer 146. In some embodiments, log data is not protected from over-writing in the log storer 144 following analysis of the log data by the log analyzer 146.

The log analyzer 146 is configured to receive log data from the log storer 144 and determine whether the occupant request of the log data matches any records stored in the database 148. In some embodiments, the log analyzer 146 includes a trained neural network (NN) to compare the log data with known objects from the database 148. Once a match between the log data and a known object in the database 148 is found, then log analyzer 146 determines the requested data from the log data, such as object identification, object hours of operation, historical information of the object, etc. The log analyzer 146 extracts information from the database 148 that satisfies the requested data and transfers the extracted information to the analysis result transmitter 150. In some embodiments, the extracted information is transferred to the analysis result transmitter along with identification information for the log data.

The database 148 is configured to store information related to objects in association with a location of the object and an image of the object. In some embodiments, the database 148 includes a solid-state memory device. In some embodiments, the database 148 includes a dynamic random-access memory (DRAM). In some embodiments, the database 148 includes a non-volatile memory device. In some embodiments, the database 148 includes a relational database (RDB). In some embodiments, the database 148 includes a Key Value Store (KVS). In some embodiments, the database 148 includes NoSQL database. In some embodiments, the database 148 includes cloud-based storage or another suitable storage structure. In some embodiments, the database 148 is integral with the log storer 144. In some embodiments, the database 148 is separate from the log storer 144. In some embodiments, the database 148 is configured to store information related to analysis results for previous occupant requests. In some embodiments, the log analyzer 146 is able to retrieve the results from the previous occupant requests in response to a determination that the log data matches a previous occupant request. In some embodiments, the database 148 stores a feature map that is generated by NN instead of storing image data.

The analysis result transmitter 150 is configured to receive the information satisfying the occupant request from the log analyzer 146. The analysis result transmitter 150 is configured to transmit the information to the mobile device 160. In some embodiments, the analysis result transmitter 150 is configured to transmit the information to the vehicle system 110 instead of or in addition to the mobile device 160. In some embodiments, the server 140 is configured to determine whether the data transfer rate from the server 140 to the mobile device 160 is higher than a transfer rate from server 140 to the vehicle system 110. In response to a determination that the data transfer rate from the server 140 to the mobile device 160 is higher, the analysis result transmitter 150 is configured to transmit the information to the mobile device 160 to be transmitted to the vehicle system 110. In response to a determination that the data transfer rate from the server 140 to the vehicle system 110 is higher, the analysis result transmitter 150 is configured to transmit the information to the vehicle system 110 directly without the information going through the mobile device 160. In some embodiments, the analysis result transmitter 150 is configured to transfer the information wirelessly. In some embodiments, the analysis result transmitter 150 is configured to transmit the information via a wired connection. In some embodiments, the analysis result transmitter 150 is configured to transmit identification information for the log data associated with the information as well. Transmitting the identification information for the log data helps the mobile device 160 or the vehicle system 110 to display both the data request and the analysis result to the occupant.

The log transmitter 152 is configured to transmit information related to the processing of the log data by the server 140. In some embodiments, the log transmitter 152 transmits the information to the mobile device 160. In some embodiments, the log transmitter 152 transmits the information to the vehicle system 110. In some embodiments, the server 140 is configured to determine whether the data transfer rate from the server 140 to the mobile device 160 is higher than a transfer rate from server 140 to the vehicle system 110. In response to a determination that the data transfer rate from the server 140 to the mobile device 160 is higher, the log transmitter 152 is configured to transmit the information to the mobile device 160 to be transmitted to the vehicle system 110. In response to a determination that the data transfer rate from the server 140 to the vehicle system 110 is higher, the log transmitter 152 is configured to transmit the information to the vehicle system 110 directly without the information going through the mobile device 160. In some embodiments, the log transmitter 152 is configured to transmit the log data to the mobile device 160 and/or the vehicle system 110 for review by the occupant. In some embodiments, the log transmitter 152 is configured to transmit identification information for the log data to the mobile device 160 and/or the vehicle system 110 in response to the log analyzer 146 taking the log data out of the queue in the log storer 144. In some embodiments, the log transmitter 152 transmits the information wirelessly. In some embodiments, the log transmitter 152 transmits the information via a wired connection.

The mobile device 160 includes a log receiver 162 configured to receive information from the log transmitter 152. The mobile device further includes an analysis result receiver 164 configured to receive information from the analysis result transmitter 150. The mobile device 160 further includes a UI 166 configured to convey information to the occupant 180 based on the information received from the log transmitter 152 and the analysis result transmitter 150. The UI 166 is further configured to receive input information from the occupant 180. The mobile device 160 further includes a microphone 168 configured to receive request initiation information and request data from the occupant 180. The mobile device 160 further includes a voice recognizer 170 configured to analyze the data received by the microphone 168 and determine a content of the request initiation information and the request data. The mobile device 160 further includes a request transmitter 172 configured to transmit the request data to the request receiver 130.

The log receiver 162 is configured to receive information from the log transmitter 152. In some embodiments, the log receiver 162 is configured to receive the information wirelessly. In some embodiments, the log receiver 162 is configured to receive the information via a wired connection.

The analysis result receiver 164 is configured to receive information from the analysis result transmitter 150. In some embodiments, the analysis result receiver 164 is configured to receive the information wirelessly. In some embodiments, the log receiver 162 is configured to receive the information via a wired connection.

The UI 166 is configured to receive information from the log receiver 162 and the analysis result receiver 164. The UI 166 is configured to convey the received information to the occupant 180. In some embodiments, the UI 166 includes a touchscreen. In some embodiments, the UI 166 is part of a smartphone. In some embodiments, the UI 166 is integrated into a vehicle including the vehicle system 110. In some embodiments, the UI 166 is configured to receive input from the occupant 180. In some embodiments, the UI 166 is configured to receive an input indicating an identity of the occupant 180. In some embodiments, the UI 166 is configured to receive an input corresponding to a data request from the occupant 180.

The microphone 168 is configured to capture audio signals from the occupant 180. In some embodiments, the microphone 168 is part of a smartphone. In some embodiments, the microphone 168 is integral with a vehicle including the vehicle system 110. In some embodiments, the microphone 168 includes a directional microphone. In some embodiments, the microphone 168 is configured to capture a voice of the occupant 180.

The voice recognizer 170 is configured to receive an audio signal from the microphone 168 and determine a content of the audio signal. In some embodiments, the voice recognizer 170 is configured to determine whether the audio signal indicates a request initiation, such as a keyword or key phrase. In some embodiments, the voice recognizer 170 is configured to determine a type of data requested by the occupant 180, such as identifying an object, information about an object, etc. In some embodiments, the voice recognizer 170 is further configured to determine an identity of the occupant 180. In some embodiments, the voice recognizer 170 is configured to determine the identity of the occupant 180 based on voice recognition software. In some embodiments, the voice recognizer 170 is configured to determine the identity of the occupant 180 based on an identifying keyword or key phrase, such as an occupant name or other identifying information. In some embodiments, the voice recognizer 170 is configured to determine the identity of the occupant 180 based on an input received at the UI 166. In some embodiments, the voice recognizer 170 is configured to determine the identity of the occupant 180 based on an input from the vehicle system 110, such as an image of the occupant that is speaking from the occupant monitoring camera 112.

The above description relates to a request initiation based on a verbal input. One of ordinary skill in the art will recognize that the current description is not limited to a verbal request initiation. In some embodiments, the request initiation includes an input received at the UI 166. In some embodiments, the request initiation includes a detected gesture, such as a gesture detected using occupant monitoring camera 112. In some embodiments, the request initiation includes a combination of different inputs, such as an input at the UI 166 and a verbal input, or a recognition result of a face of the occupant, or a recognition result of an iris of an eye of the occupant by the gaze detector 122 or other suitable combinations. Inclusion of a request initiation as part of an occupant request helps to minimize unnecessary processing and data transmission which helps to minimize processing load and power consumption for the vehicle including the vehicle system 110. As more vehicles become electric vehicles (EVs), minimizing power consumption becomes a greater concern in order to maintain battery charge and maximize a distance that the EV is able to travel without re-charging.

The request transmitter 172 is configured to receive request information from the voice recognizer 170 and transmit information to the request receiver 130. In some embodiments, the request transmitter 172 is configured to transmit a request initiation signal in response to the voice recognizer 170 identifying a request initiation. In some embodiments, the request transmitter 172 does not send a signal in response to the voice recognizer 170 identifying a request initiation. Sending a signal in response to a request initiation helps the vehicle system 110 to store sensor data to improve accuracy and precision of satisfying the occupant request. However, sending the signal in response to a request initiation increases an amount of data transmitted and processing load. The request transmitter 172 is configured to transmit the occupant request based on the analysis by the voice recognizer 170. In some embodiments, the request transmitter 172 is configured to transmit the occupant request or other information wirelessly. In some embodiments, the request transmitter 172 is configured to transmit the occupant request or other information via a wired connection.

One of ordinary skill in the art would understand that modifications to the object identification system 100 are within the scope of this disclosure. For example, in some embodiments, the microphone 168 and the voice recognizer 170 are omitted and occupant requests, including request initiation, are received through the UI 166. In some embodiments, results of the analysis by the server 140 transmitted to the mobile device 160 cause an alert, such as an audio or visual alert, to automatically display on the mobile device 160.

Figure 2:
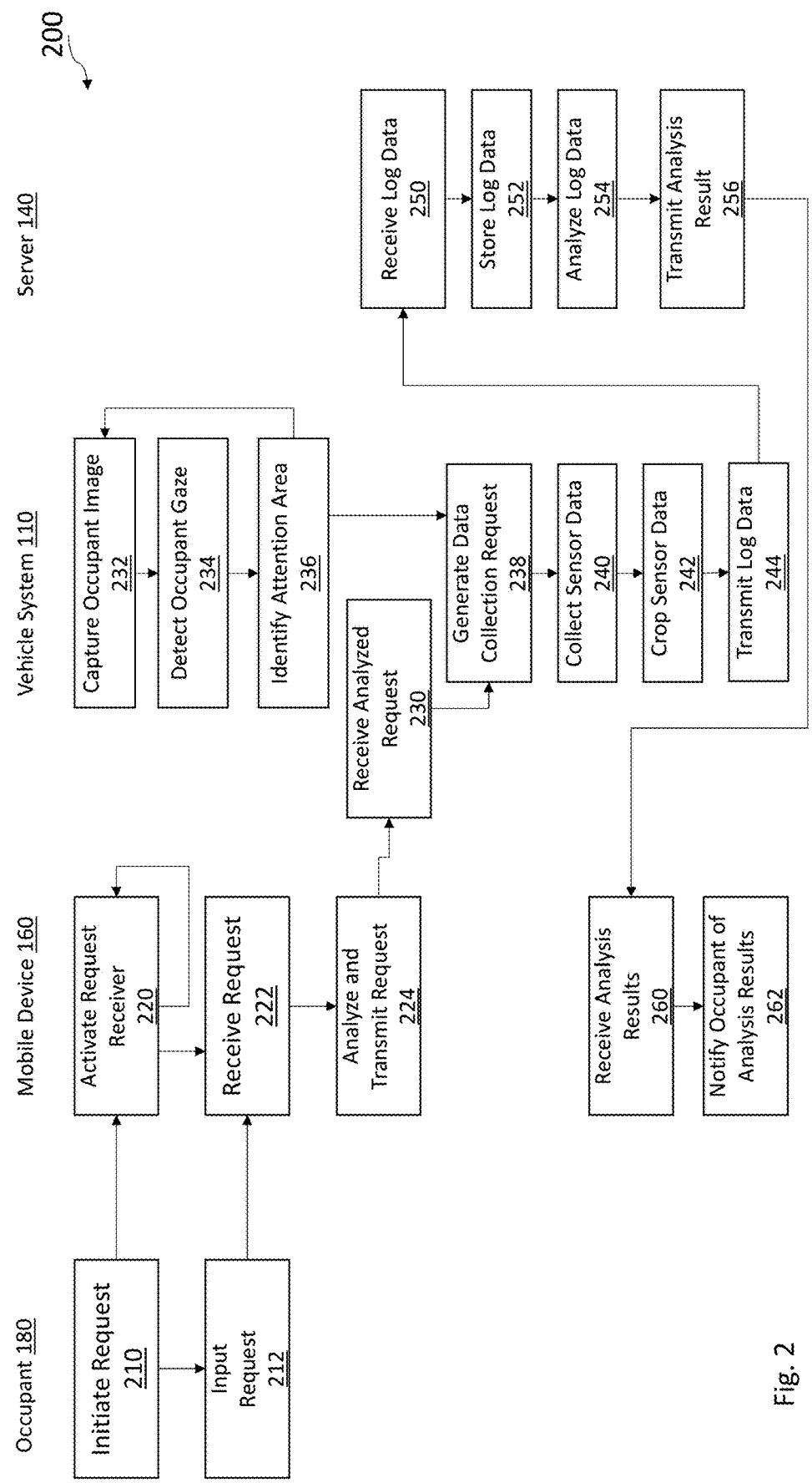
FIG. 2 is a flowchart of a method of identifying an object in accordance with some embodiments.
Figure 11:
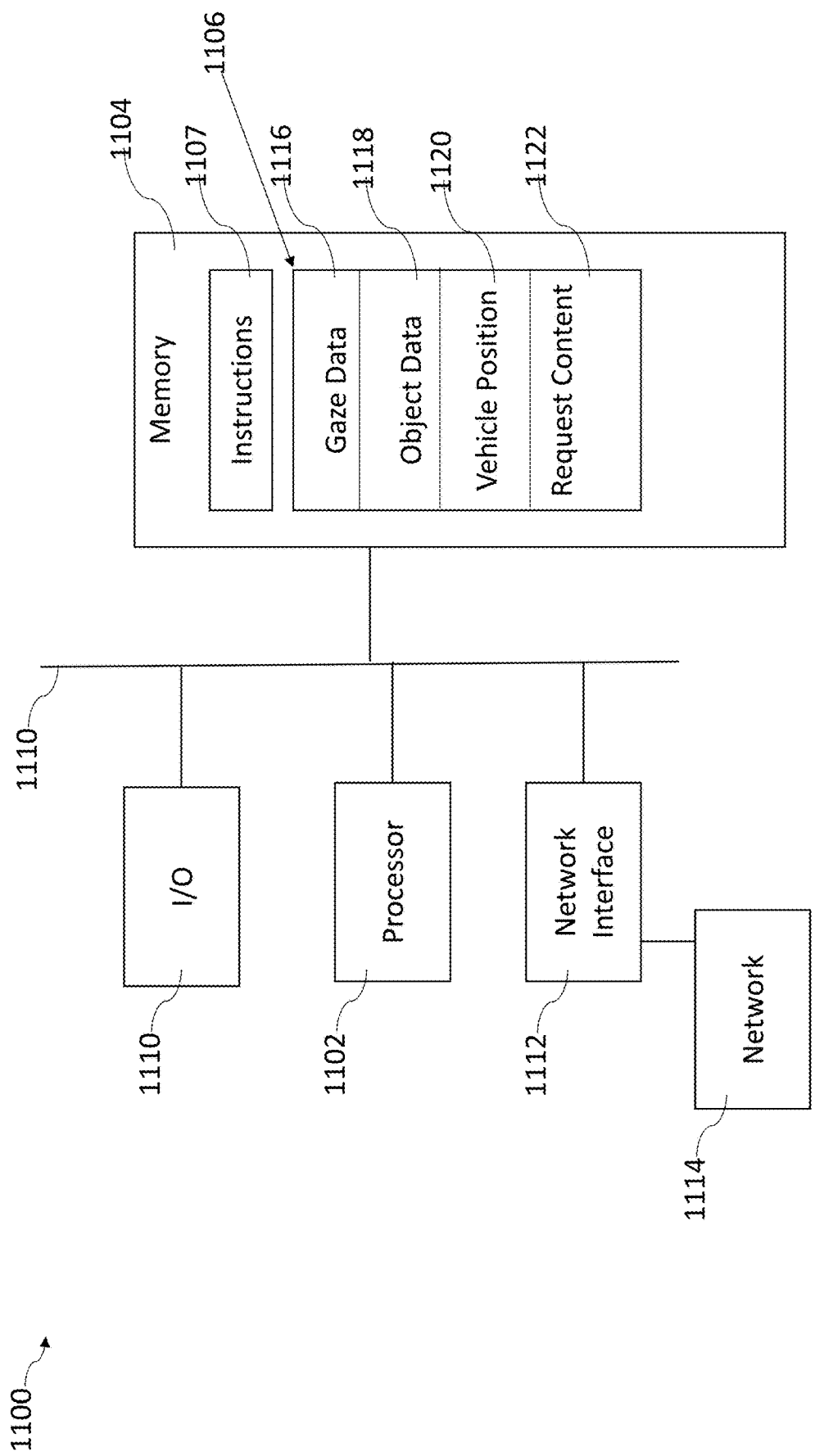
FIG. 11 is a block diagram of a system for implementing object identification in accordance with some embodiments.

FIG. 2 is a flowchart of a method 200 of identifying an object in accordance with some embodiments. In some embodiments, the method 200 is implemented using system 100 (FIG. 1). In some embodiments, the method 200 is implemented using system 1100 (FIG. 11).

In operation 210, the occupant 180 initiates a request. Initiating the request helps to avoid unnecessary processing load on the mobile device 160, the vehicle system 110 and the server 140 by avoiding processing inadvertently triggered occupant requests. In some embodiments, initiating the request includes the occupant 180 speaking a keyword or a key phrase, e.g., detected by the microphone 168 (FIG. 1). In some embodiments, initiating the request includes the occupant touching a button, e.g., on UI 166 (FIG. 1). In some embodiments, initiating the request includes the mobile device 160 or the vehicle system 110 detecting, e.g., using the occupant monitoring camera 112 (FIG. 1), a predetermined gesture by the occupant 180. Once the request is initiated, the mobile device activates a request receiver in operation 220; and the occupant 180 is able to input a request in operation 212.

In operation 212, the occupant 180 inputs the request. The request is the information that the occupant 180 would like to know about an object of interest. In some embodiments, the request includes identifying information about the object. In some embodiments, the request includes other information about the object, such as hours of operation, directions to the object, historical information about the object, or other suitable information. In some embodiments, the occupant 180 inputs the request verbally, e.g., detected by the microphone 168 (FIG. 1). In some embodiments, the occupant 180 inputs the request using a UI, e.g., UI 166 (FIG. 1). In some embodiments, the occupation 180 inputs the request using a predetermined gesture, e.g., detected by occupant monitoring camera 112 (FIG. 1). In some embodiments, a manner of initiating a request and inputting the request are the same, e.g., both initiation and inputting are performed verbally by the occupant. In some embodiments, a manner of initiating the request and inputting the request are different, e.g., initiation is performed using a UI and inputting is performed verbally. Other combinations of initiation and inputting of requests are within the scope of this disclosure.

In operation 220, the mobile device 160 activates a request receiver 220. Activating the request receiver in response to initiating the request helps the mobile device 160 to conserve power by avoiding having the request receiver be constantly monitoring for requests from the occupant 180. In some embodiments, activating the request receiver includes displaying an input screen on a UI, e.g., UI 166 (FIG. 1). IN some embodiments, activating the request receiver includes initializing a microphone, e.g., microphone 168 (FIG. 1). In some embodiments, activating the request receiver includes activating circuitry within the mobile device 160 that will process a received request.

The operation 220 is repeated until the mobile device 160 receives an input request in operation 212. In some embodiments, following a predetermined time period, e.g., 10 seconds to 30 seconds, without receiving the input request from operation 212, the operation 220 is discontinued and the request receiver returns to a sleep or low power state. If the predetermined time period is too long, then power consumption is unnecessarily increased, in some instances. If the predetermined time period is too short, the occupant 180 will not have sufficient time to input the request in operation 212, in some instances. In some embodiments, the operation 220 is discontinued in response to receipt of a cancellation signal, e.g., triggered by a keyword, key phrase, an input to the UI, or other suitable input.

In operation 222, the mobile device 160 receives the request from operation 212. In some embodiments, the request is received directly from the occupant 180. In some embodiments, the request is receive indirectly from the occupant 180 via an external device, such as a keyboard or another suitable external device. In some embodiments, the operation 212 and the operation 222 are implemented using a same component of the mobile device 160, e.g., the microphone 168 or the UI 166 (FIG. 1).

In operation 224, the request is analyzed and transmitted. The request is analyzed to determine the type of data requested by the occupant 180. In some embodiments, the request is analyzed using the voice recognizer 170 (FIG. 1). The analyzed request is transmitted to the vehicle system 110 in order to collect log data for satisfying the request. In some embodiments, the analyzed request is transmitted using the request transmitter 172 (FIG. 1).

In operation 230, the analyzed request is received by the vehicle system 110. In some embodiments, the analyzed request is received wirelessly. In some embodiments, the analyzed request is received via a wired connection. In some embodiments, the analyzed request is received using the request receiver 130 (FIG. 1).

In operation 232, one or more images of the occupant are captured. The captured images are associated with timestamp data to determine a time at the one or more image was captured. The one or more images of the occupant capture at least one eye of the occupant. In some embodiments, images of the occupant are captured at regular intervals. In some embodiments, images of the occupant are captured in response to receiving a signal indicating that a request has been initiated, e.g., a signal from the mobile device 160 to the vehicle system 110 as part of operation 220. In some embodiments, the one or more images of the occupant are captured using the occupant monitoring camera 112 (FIG. 1). In some embodiments, only images of the occupant associated with an occupant request are captured. In some embodiments, images of more than one occupant of a vehicle are captured and only images of the occupant associated with the occupant request are used to generate request data later in method 200. In some embodiments, the operation 232 is performed in response to a signal generated in operation 220. In some embodiments, operation 232 is performed independent of receipt of initiating a request.

In operation 234, the occupant gaze is detected based on the one or more images captured in operation 232. Detecting the gaze of the occupant includes identifying angles of the occupant's gaze relative to the vehicle. In some embodiments, the angles include the azimuth angle and the elevation angle. In some embodiments, detecting the gaze further includes determining a depth of the gaze relative to the vehicle position. In some embodiments, the operation 234 is implemented using the gaze detector 122 (FIG. 1).

In operation 236, an attention area is identified based on the detected gaze of the occupant from operation 234. The attention area is identified to determine a ROI for the occupant 180. In some embodiments, the attention area is identified based on world coordinates. In some embodiments, the attention area is identified based on pixel regions of an image captured by the vehicle, e.g., using front camera 114 (FIG. 1). In some embodiments, the attention area is identified based on relative coordinates with respect to the vehicle. Identifying the attention area helps to reduce an amount of data to be transmitted to the server 140 for processing. In some embodiments, the operation 236 is implemented using the attention area recognizer 124 (FIG. 1).

In some embodiments, operations 232-236 are performed continually during operation of the vehicle. The information generated by the operations 232-236 is stored in a memory within the vehicle system 110 for analysis in response to receiving an occupant request. In some embodiments, operations 232-236 are performed in response to receiving an initiate request signal as part of operation 220. In some embodiments, operations 232-236 are discontinued in response to a signal received indicating that operation 220 has been discontinued due to failure to receive a timely input request or in response to a cancellation input.

In operation 238, a data collection request is generated based on the received analyzed request. The data collection request identifies information from the operations 232-236 that is usable to satisfy the received analyzed request. The data collection request identifies which sensors of the vehicle are usable to satisfy the received analyzed request. The data collection request also identifies a time period over which to collect the sensor data based on a timestamp of the received request in operation 222. In some embodiments, the operation 238 is implemented using the data request collector 132 (FIG. 1).

In operation 240, sensor data is collected based on the data collection request. In some embodiments, the sensor data is collected from a memory within the vehicle system 110. In some embodiments, the sensor data is collected from a single sensor. In some embodiments, the sensor data is collected from multiple sensors. In some embodiments, the sensor data is collected using log collector 128 (FIG. 1).

In operation 242, the sensor data collected in operation 240 is cropped. Cropping the sensor data reduces an amount of data to be transmitted to the server 140. The term cropped here is used based on the sensor data being image data. However, one of ordinary skill in the art would understand that operation 242 is used to reduced superfluous data based on the identified attention area from operation 236 regardless of a type of sensor data being used. In some embodiments, the operation 242 is implemented using log collector 128 (FIG. 1). The cropped sensor data along with timestamp information is considered log data, in some embodiments.

In operation 244, the log data is transmitted to the server 140. In some embodiments where a memory within the vehicle system 110 is able to compare the received analyzed request with previous occupant requests, the operation 244 is omitted and the results satisfying the received analyzed request are provided by the vehicle system 110 directly. In some embodiments, the log data is transmitted wirelessly. In some embodiments, the log data is transmitted via a wired connection. In some embodiments, the operation 244 is implemented using the log transmitter 134 (FIG. 1).

In operation 250, the server 140 receives the log data. In some embodiments, the operation 250 is implemented using log data receiver 142 (FIG. 1). In some embodiments where the vehicle system 110 is able to provide a result satisfying the occupant request, the log data is not transmitted to the sever 140 and the operation 250 is omitted.

In operation 252, log data is stored in the server 140. The log data is stored for later processing by the server 140. In some embodiments, the log data is stored in a priority based queue. In some embodiments, priority in the queue is based on a time that the log data is received by the server 140. In some embodiments, priority in the queue is based on a time that the occupant request was received, i.e., in operation 222. In some embodiments, priority in the queue is based on an identity of the occupant 180.

In operation 254, the log data is analyzed to determine a result that satisfies the occupant request in the log data. The log data is analyzed by comparing the data from the sensors of the vehicle with data in a database of the server 140. Once a match between an object in the vehicle sensor data and the data in the database is found, the database is queried to retrieve information that satisfies the occupant request. For example, in some embodiments, the database is queried to determine identification information for the object, hours of operation for the object, a location of the object, etc. In some embodiments, the information from the database includes a web address for the occupant 180 to find information about the object. In some embodiments where no match between the vehicle sensor data and the data in the database is found, the operation 254 returns a result indicating that no match was found. In some embodiments, the operation 254 is implemented using the log analyzer 146 (FIG. 1).

In operation 256, the analysis result from operation 254 is transmitted. In some embodiments, the analysis result is transmitted wirelessly. In some embodiments, the analysis result is transmitted via a wired connection. In the method 200, the analysis result is transmitted to the mobile device 160. In some embodiments, the analysis result is transmitted to the vehicle system 110 instead of or in addition to the mobile device 160. In some embodiments, the operation 256 is implemented using the analysis result transmitter 150 (FIG. 1).

In operation 260, the mobile device 160 receives the analysis results. In some embodiments, the analysis results include both the information from the database retrieved in operation 254 as well as log data identification information. Including log data identification information along with the analysis results helps to expedite analysis and providing of additional information about the object in a situation where the occupant requests more information about the object following the receipt of the analysis results. In some embodiments, the operation 260 is implemented using analysis result receiver 164 (FIG. 1).

In operation 262, the occupant 180 is notified of the analysis results. In some embodiments, the occupant is notified by providing the occupant 180 with a web address to access information about the object. In some embodiments, the occupant is notified by providing the occupant 180 with the requested information about the object. In some embodiments, the occupant 180 is notified using a visual notification. In some embodiments, the occupant 180 is notified using an audio notification. In some embodiments, the occupant is notified using UI 166 (FIG. 1). In some embodiments, the occupant 180 is notified by an alert, at least one of audio or visual, automatically appearing on the mobile device 160 in response to receiving the analysis results from the server 140. In some embodiments, the notification to the occupant 180 includes the vehicle sensor data, such as a cropped image, included as part of the log data to allow the occupant 180 to confirm that the received information corresponds to the intended object of interest. In some embodiments, the notification to the occupant 180 includes a request for confirmation that the object of interest was correctly identified; and results of the request for confirmation are provided to the server 140 to help improve performance of log data analysis in operation 254. In some embodiments, after the operation 262, the occupant gives a feedback to at least one of the server 140, the mobile device 160, or the vehicle system 110 about whether the received results were really relevant to the request that the occupant made or about whether the occupant liked the information or not. This feedback provides training of a neural network (NN) so that the log analyzer 146, the attention area recognizer 124, the data collection requester 132, and the voice recognizer 170 are able to be tuned or trained so that the false positives and false negatives are reduced over time.

One of ordinary skill in the art would recognize that modifications to the method 200 are within the scope of this disclosure. In some embodiments, additional operations are included in the method 200. For example, in some embodiments, the method 200 includes updating of the database in the server 140 based on confirmation results from the occupant following notification of analysis results. In some embodiments, at least one operation of the method 200 is omitted. For example, in some embodiments, the operation 242 is omitted if data transmission size is not a concern. In some embodiments, an order of operations of the method 200 is changed. For example, in some embodiments, the operation 234 occurs after operation 230 to reduce processing load on the vehicle system 110. One of ordinary skill in the art would recognize that other modifications are within the scope of this disclosure.

Figure 3:
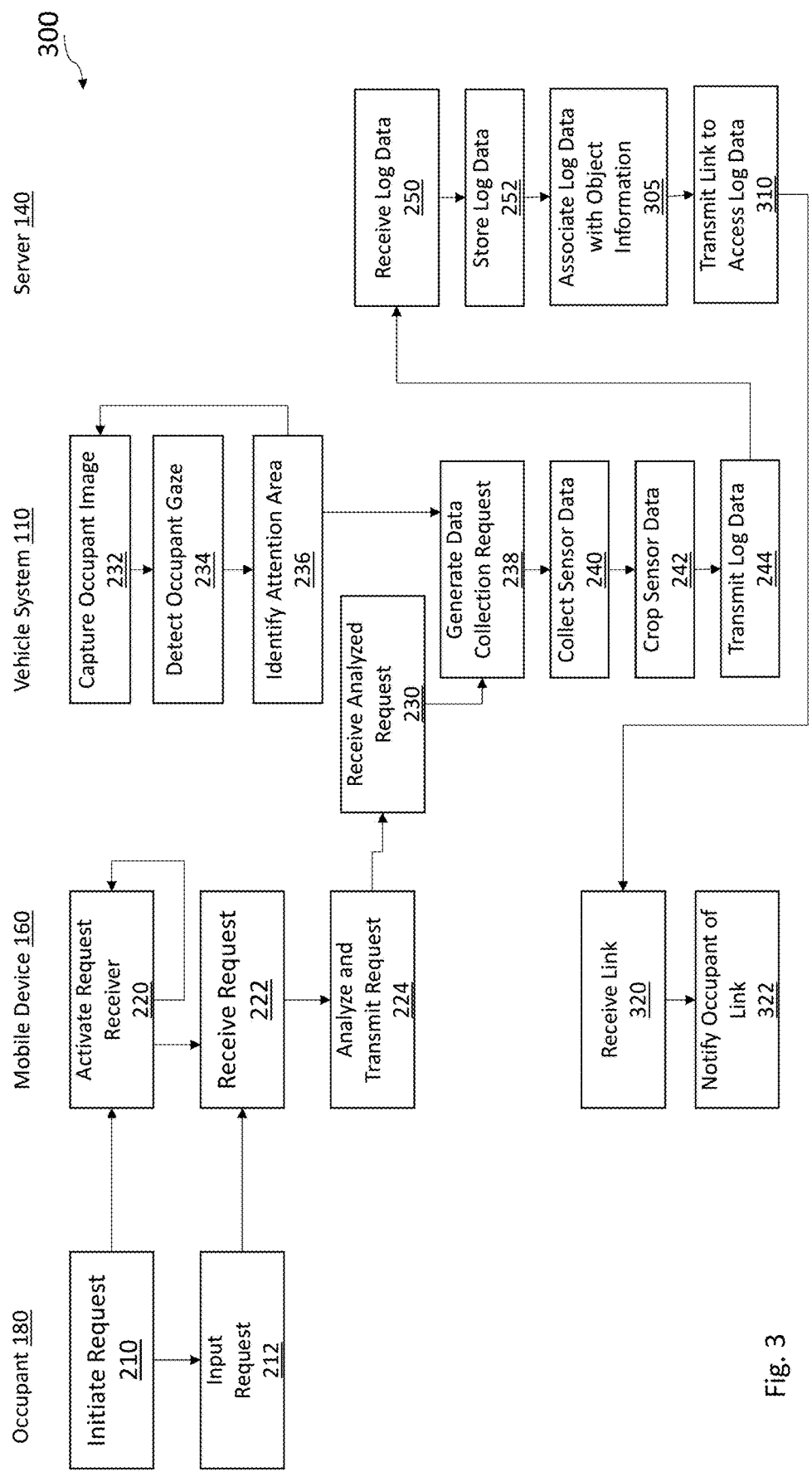
FIG. 3 is a flowchart of a method of identifying an object in accordance with some embodiments.

FIG. 3 is a flowchart of a method 300 of identifying an object in accordance with some embodiments. In some embodiments, the method 300 is implemented using system 100 (FIG. 1). In some embodiments, the method 300 is implemented using system 1100 (FIG. 11). The method 300 is similar to the method 200 (FIG. 2). Operations in method 300 that are similar to operations in method 200 have a same reference number. For the sake of brevity, only the operations of method 300 that are different from operations in method 200 are discussed below.

In operation 305, the log data is analyzed and associated with object information for the object of interest. The log data is analyzed by comparing the data from the sensors of the vehicle with data in a database of the server 140. Once a match between an object in the vehicle sensor data and the data in the database is found, a link to the object information in the database for the matching object is associated with the log data. The link allows the occupant 180 to access the database in the server 140 to obtain the requested information about the object. In some embodiments, the link includes Uniform Resource Locator (URL) which the occupant is able to open using the UI 166 (such as web browser). In some embodiments, the link permits the occupant 180 to obtain additional information about the object other than just the requested information. In some embodiment, the log data is analyzed by comparing the feature map that is extracted by NN from the data from the sensors of the vehicle with feature map that is extracted by NN from data in a database of the server 140. In some embodiments, the operation 305 is implemented using the log analyzer 146 (FIG. 1).

In operation 310, the link to access the log data and associated object information from operation 305 is transmitted. In some embodiments, the link is transmitted wirelessly. In some embodiments, the link is transmitted via a wired connection. In the method 300, the link is transmitted to the mobile device 160. In some embodiments, the link is transmitted to the vehicle system 110 instead of or in addition to the mobile device 160. In some embodiments, the operation 310 is implemented using the analysis result transmitter 150 (FIG. 1).

In operation 320, the mobile device 160 receives the link. In some embodiments, the link includes both the link for accessing the database as well as log data identification information. Including log data identification information along with the analysis results helps to expedite analysis and providing of additional information about the object in a situation where the occupant requests more information about the object following the receipt of the link and the link does not provide access to all information about the object stored in the database. In some embodiments, the operation 320 is implemented using analysis result receiver 164 (FIG. 1).

In operation 322, the occupant 180 is notified of the link. In some embodiments, the occupant is notified by providing the occupant 180 with a web address to access information about the object. In some embodiments, the occupant is notified by providing the occupant 180 with a selectable icon for accessing the information about the object. In some embodiments, the occupant 180 is notified using a visual notification. In some embodiments, the occupant 180 is notified using an audio notification. In some embodiments, the occupant is notified using UI 166 (FIG. 1). In some embodiments, the occupant 180 is notified by an alert, at least one of audio or visual, automatically appearing on the mobile device 160 in response to receiving the link from the server 140. In some embodiments, the notification to the occupant 180 includes the vehicle sensor data, such as a cropped image, included as part of the log data to allow the occupant 180 to confirm that the received information corresponds to the intended object of interest. In some embodiments, the notification to the occupant 180 includes a request for confirmation that the object of interest was correctly identified; and results of the request for confirmation are provided to the server 140 to help improve performance of log data analysis in operation 305.

One of ordinary skill in the art would recognize that modifications to the method 300 are within the scope of this disclosure. In some embodiments, additional operations are included in the method 300. For example, in some embodiments, the method 300 includes updating of the database in the server 140 based on confirmation results from the occupant following notification of link. In some embodiments, at least one operation of the method 300 is omitted. For example, in some embodiments, the operation 242 is omitted if data transmission size is not a concern. In some embodiments, an order of operations of the method 300 is changed. For example, in some embodiments, the operation 234 occurs after operation 230 to reduce processing load on the vehicle system 110. One of ordinary skill in the art would recognize that other modifications are within the scope of this disclosure.

Figure 4:
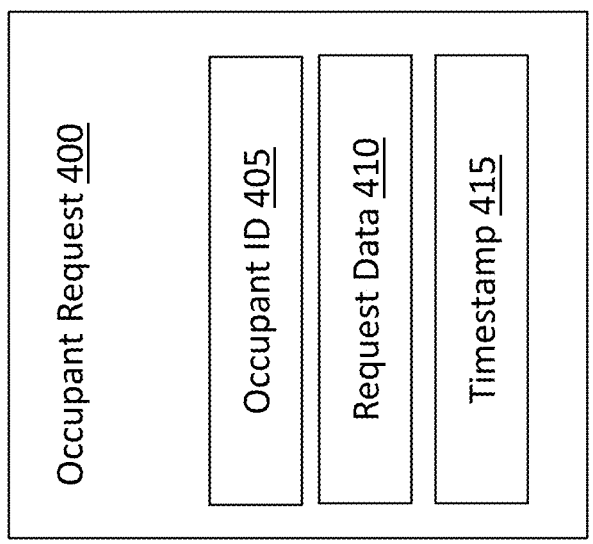
FIG. 4 is a view of a data structure of an occupant request in accordance with some embodiments.

FIG. 4 is a view of a data structure 400 of an occupant request in accordance with some embodiments. In some embodiments, the data structure 400 corresponds to status of the occupant request received from the occupant 180 by the microphone 168 and processed by the voice recognizer 170 (FIG. 1). In some embodiments, the data structure 400 corresponds to occupant request received in operation 222 (FIG. 2).

The data structure 400 includes occupant identification information 405. The occupant identification information 405 indicates an identity of the occupant that made the occupant request. In some embodiments, the occupant identification information 405 is determined based on analysis by the voice recognizer 170 (FIG. 1). In some embodiments, the occupant identification information 405 is determined based on an input at the UI 116 (FIG. 1). In some embodiments, the occupant identification information 405 is determined based on who has control of the mobile device 160 (FIG. 1). In some embodiments, the occupant identification information 405 is determined based on recognition result of an iris of the eye of the occupant recognize d by a camera on the mobile device 160. In some embodiments, the occupant identification information 405 is determined based on a fingerprint of the occupant recognize d by the mobile device 160 or by a sensor on a steering wheel of the vehicle. The data structure 400 further includes request data 410. The request data 410 includes a content of the information requested by the occupant. In some embodiments, the request data 410 includes a request for identification of an object. In some embodiments, the request data 410 includes a request for information about the object in addition to or different from identification of the object. The data structure 400 further includes timestamp information 415. The timestamp information 415 indicates a time corresponding to receipt of the requested information from the occupant.

The data structure 400 is merely exemplary and one of ordinary skill in the art would understand that different information is able to be included in the occupant request data. In some embodiments, at least one of the components is excluded from the data structure 400. For example, in some embodiments, the occupant identification information 405 is excluded from the data structure 400. In some embodiments, additional information is included in the data structure 400. For example, in some embodiments, the data structure 400 further includes information about a location of the occupant within the vehicle.

Figure 5:
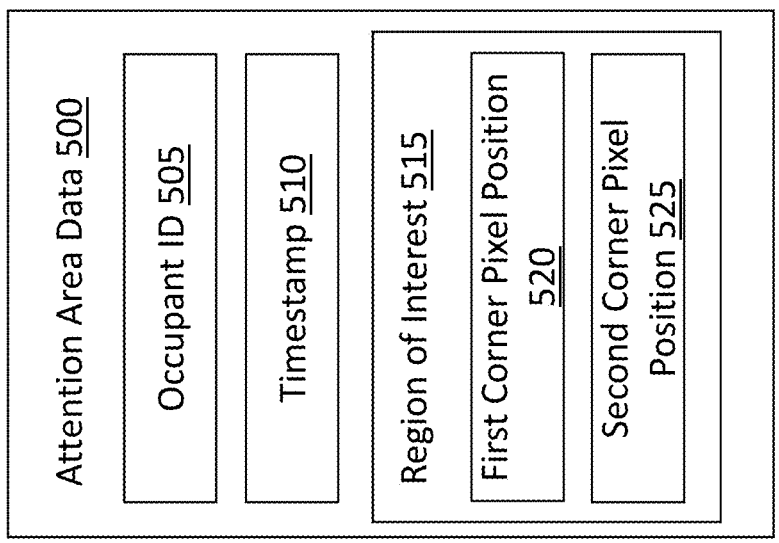
FIG. 5 is a view of a data structure of attention area data in accordance with some embodiments.

FIG. 5 is a view of a data structure 500 of attention area data in accordance with some embodiments. In some embodiments, the data structure 500 corresponds to an attention area determined by the attention area analyzer 124 (FIG. 1). In some embodiments, the data structure 500 corresponds to an attention area identified in operation 236 (FIG. 2).

The data structure 500 includes occupant identification information 505. The occupant identification information 505 indicates an identity of the occupant that made the occupant request. In some embodiments, the occupant identification information 505 is determined based on analysis by the voice recognizer 170 (FIG. 1). In some embodiments, the occupant identification information 505 is determined based on an input at the UI 116 (FIG. 1). In some embodiments, the occupant identification information 505 is determined based on who has control of the mobile device 160 (FIG. 1). In some embodiments, the occupant identification information 405 is determined based on recognition result of the iris of the eye of the occupant recognize d by gaze detector 122 or a camera on the mobile device 160. In some embodiments, the occupant identification information 405 is determined based on the fingerprint of the occupant recognize d by the mobile device 160 or by a sensor on the steering wheel of the vehicle. The data structure 500 further includes timestamp information 510. In some embodiments, the timestamp information 510 indicates a time corresponding to receipt of the requested information from the occupant. In some embodiments, the timestamp information 510 includes information related to a time when data was captured by the vehicle sensors. In some embodiments, the timestamp information 510 includes information related to a time when the attention area was determined. The data structure 500 further includes region of interest (ROI) information 515. The ROI information 515 indicates a location, e.g., in an image, where the attention area is determined to be located. The ROI information 515 is determined based on a correlation between gaze data for the occupant associated with the occupant identification information 505 and sensor data from the vehicle. The ROI information 515 includes a first corner pixel position 520. In some embodiments, the first corner pixel position 520 indicates a location within an image of a top left corner of an attention area determined based on the gaze data for the occupant. The ROI information 515 further includes a second corner pixel position 525. In some embodiments, the second corner pixel position 525 indicates a location within the image of a bottom right corner of the attention area determined based on the gaze data for the occupant. Using the first corner pixel position 520 and the second corner pixel position 525, boundaries of the determined attention area are able to be set using minimal position information. In some embodiments, the ROI information 515 is usable for cropping an image, e.g., using log collector 128 (FIG. 1) or in operation 242 (FIG. 2).

The data structure 500 is merely exemplary and one of ordinary skill in the art would understand that different information is able to be included in the attention area data. In some embodiments, at least one of the components is excluded from the data structure 500. For example, in some embodiments, the occupant identification information 505 is excluded from the data structure 500. In some embodiments, additional information is included in the data structure 500. For example, in some embodiments, the data structure 500 further includes additional corner pixel positions for the ROI information 515.

Figure 6:
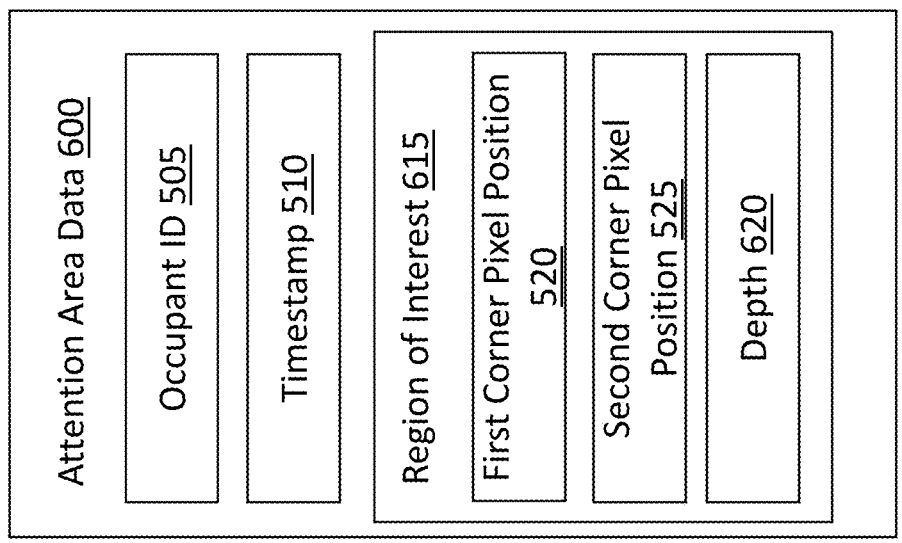
FIG. 6 is a view of a data structure of attention area data in accordance with some embodiments.

FIG. 6 is a view of a data structure 600 of attention area data in accordance with some embodiments. In some embodiments, the data structure 600 corresponds to an attention area determined by the attention area analyzer 124 (FIG. 1). In some embodiments, the data structure 600 corresponds to an attention area identified in operation 236 (FIG. 2). The data structure 600 is similar to the data structure 500 (FIG. 5). Components of the data structure 600 that are similar to the data structure 500 have a same reference number. For the sake of brevity only components of the data structure 600 that are different from the data structure 500 are discussed below.

The data structure 600 includes ROI information 615 that includes depth information 620 in addition to the first corner pixel position 520 and the second corner pixel position 525. The depth information 620 is usable to determine a distance from the vehicle at which a gaze of the occupant is focused. In some embodiments, the depth information 620 is determined using the gaze detector 122 (FIG. 1) or in operation 234 (FIG. 2). Including the depth information 620 helps to increase precision of determining an object about which the occupant is requesting information.

The data structure 600 is merely exemplary and one of ordinary skill in the art would understand that different information is able to be included in the attention area data. In some embodiments, at least one of the components is excluded from the data structure 600. For example, in some embodiments, the occupant identification information 505 is excluded from the data structure 600. In some embodiments, additional information is included in the data structure 600. For example, in some embodiments, the data structure 600 further includes additional corner pixel positions for the ROI information 615.

Figure 7:
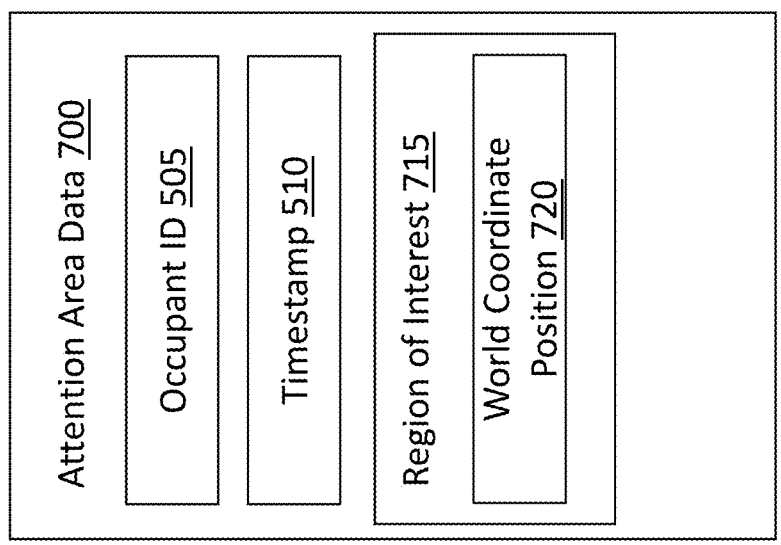
FIG. 7 is a view of a data structure of attention area data in accordance with some embodiments.

FIG. 7 is a view of a data structure of attention area data in accordance with some embodiments. In some embodiments, the data structure 700 corresponds to an attention area determined by the attention area analyzer 124 (FIG. 1). In some embodiments, the data structure 700 corresponds to an attention area identified in operation 236 (FIG. 2). The data structure 700 is similar to the data structure 500 (FIG. 5). Components of the data structure 700 that are similar to the data structure 500 have a same reference number. For the sake of brevity only components of the data structure 700 that are different from the data structure 500 are discussed below.

The data structure 700 includes ROI information 715 that includes world coordinate position information 720 in place of the first corner pixel position 520 and the second corner pixel position 525. The world coordinate position information 720 is usable to determine a location of the object within the real world. In some embodiments, the world coordinate position information 720 is determined using the log collector 128 (FIG. 1) or in operation 236 (FIG. 2). Including the world coordinate position information 720 helps to increase precision of determining an object about which the occupant is requesting information.

The data structure 700 is merely exemplary and one of ordinary skill in the art would understand that different information is able to be included in the attention area data. In some embodiments, at least one of the components is excluded from the data structure 700. For example, in some embodiments, the occupant identification information 505 is excluded from the data structure 700. In some embodiments, additional information is included in the data structure 700. For example, in some embodiments, the data structure 700 further includes at least a partial image of the object.

Figure 8:
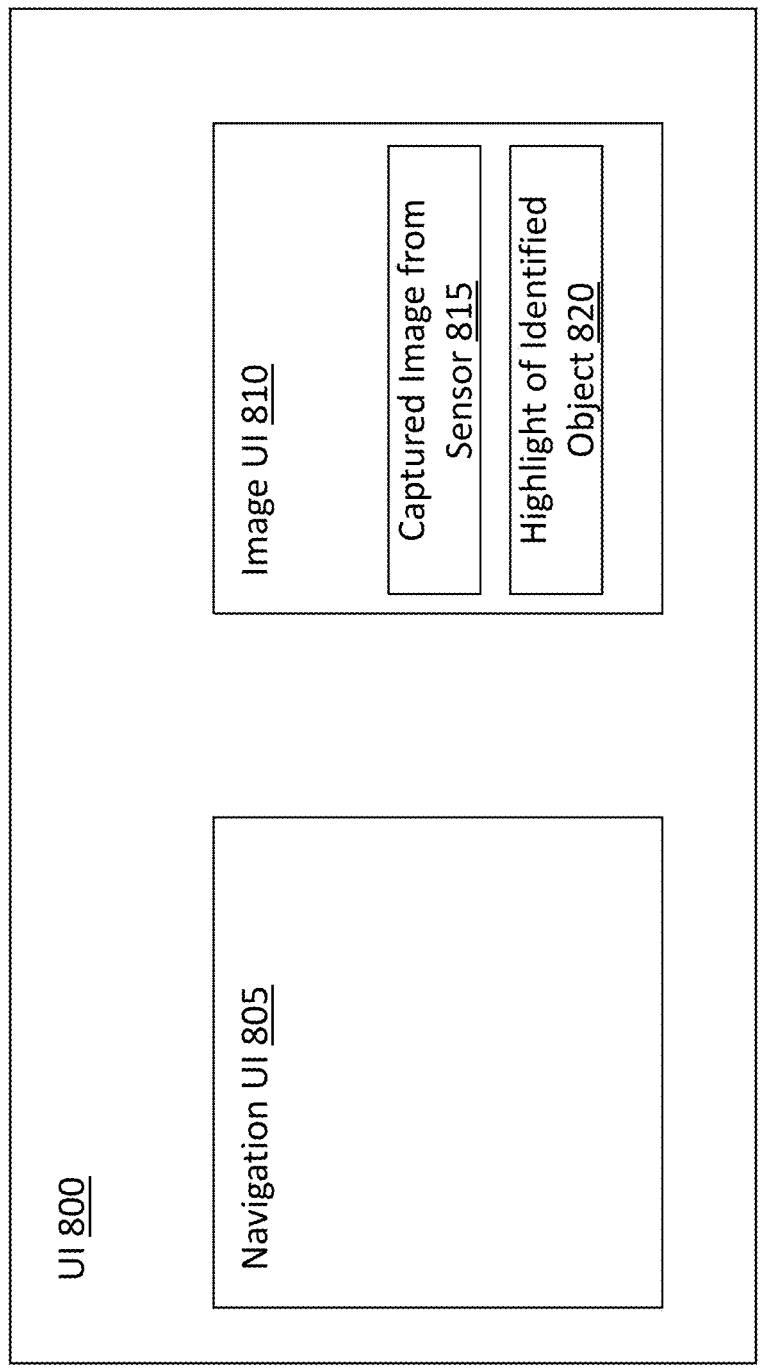
FIG. 8 is a view of a user interface in accordance with some embodiments.

FIG. 8 is a view of a user interface 800 in accordance with some embodiments. In some embodiments, the UI 800 corresponds to UI 116 (FIG. 1). In some embodiments, UI 800 is part of mobile device 160 (FIG. 1). In some embodiments, UI 800 is part of vehicle system 110 (FIG. 1).

The UI 800 includes a navigation UI 805 and an image UI 810. The image UI 810 includes a captured image from a vehicle sensor 815 and a highlight of the identified object 820. The UI 800 is usable to notify the occupant of the object that was identified as a source of the occupant request using image UI 810. The UI 800 is further usable to notify the occupant of a travel path to the object using navigation UI 805. In some embodiments, the UI 800 is configured to receive information from the occupant of the as part of the occupant request, request initiation, confirmation of the identified object or other such input information. In some embodiments, the UI 800 is integrated into the vehicle. In some embodiments, the 800 is separable from the vehicle.

The navigation UI 805 is configured to receive GPS information, e.g., from GPS 116 (FIG. 1), and display a map visible to the driver of the vehicle. The navigation UI 805 is further configured to display a travel path along the map that the vehicle is able to traverse to reach the identified object. In some embodiments, the navigation UI 805 includes a touchscreen. In some embodiments, the navigation UI 805 is configured to receive updates to the map and/or the travel path from an external device, such as the server 140 (FIG. 1).

The image UI 810 includes a captured image from the vehicle sensor 815 and a highlight of the identified object 820. The highlight of the identified object 820 overlaps the image from the vehicle sensor 815 to identify the object within the image from the vehicle sensor. In some embodiments, the image from the vehicle sensor 815 is a cropped image from the vehicle sensor. In some embodiments, the image UI 810 is able to receive input from the occupant to confirm or deny the accuracy of the identified object. In some embodiments, the image UI 810 includes a touchscreen.

FIG. 8 includes the navigation UI 805 as being separate from the image UI 810. In some embodiments, the image UI 810 is overlaid on the navigation UI 805. In some embodiments, the image UI 810 is hidden while vehicle is in motion.

Figure 9:
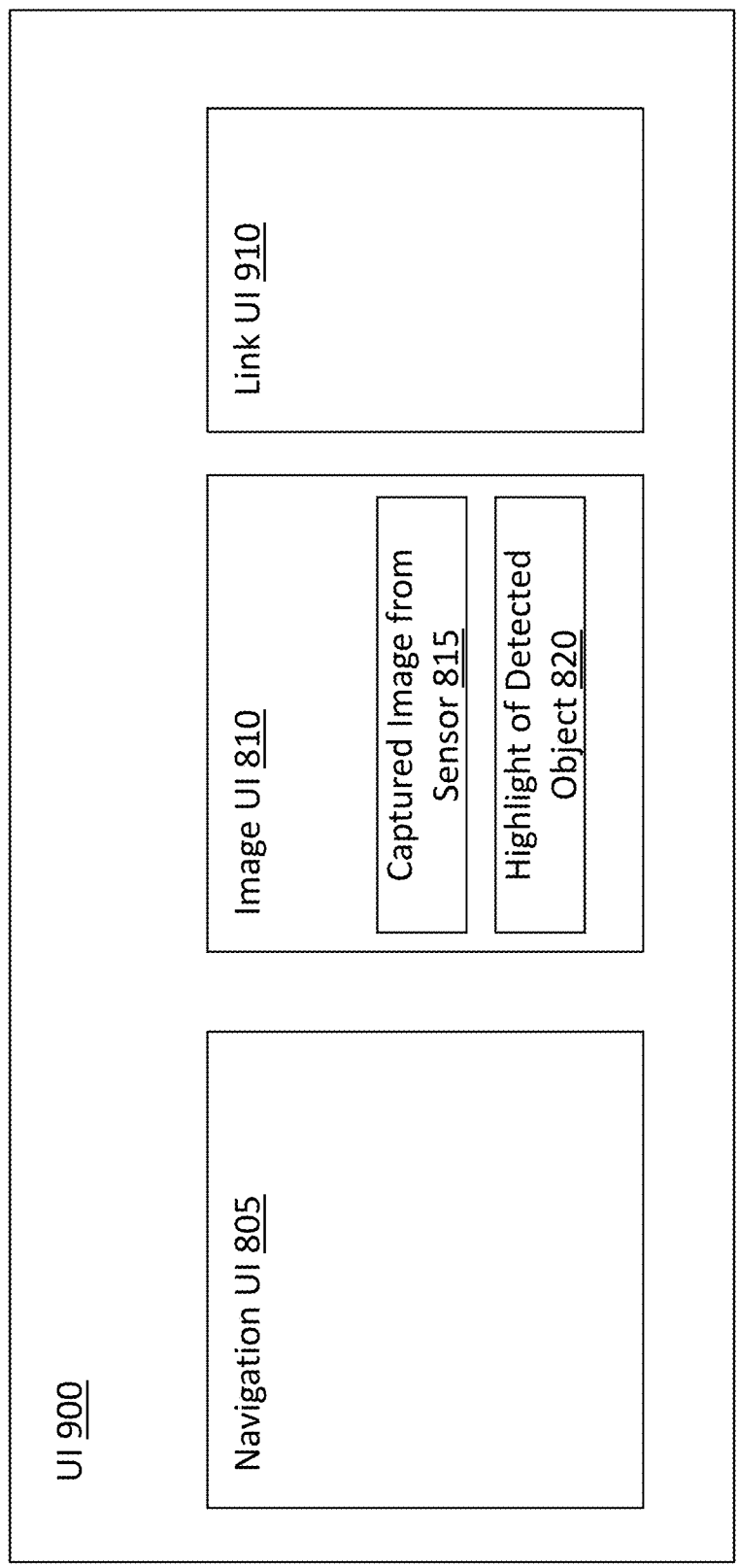
FIG. 9 is a view of a user interface in accordance with some embodiments.

FIG. 9 is a view of a user interface 900 in accordance with some embodiments. In some embodiments, the UI 900 corresponds to UI 116 (FIG. 1). In some embodiments, UI 900 is part of mobile device 160 (FIG. 1). In some embodiments, UI 900 is part of vehicle system 110 (FIG. 1). The UI 900 is similar to the UI 800. Components of the UI 900 that are similar to the UI 800 have a same reference number. For the sake of brevity, only components of UI 900 that are different from UI 800 are discussed below.

The UI 900 includes a link UI 910 configured to display a link to object information, e.g., a link received in operation 320 (FIG. 3). In some embodiments, the link UI 910 includes a selectable link and is configured to display the object information in response to retrieving the information following selection of the link by the occupant. In some embodiments, the link UI 910 is configured to display an icon associated with the link. In some embodiments, the link UI 910 includes a touchscreen.

FIG. 9 includes the navigation UI 805 as being separate from the image UI 810 and the link UI 910. In some embodiments, at least one of the image UI 810 or the link UI 910 is overlaid on the navigation UI 805. In some embodiments, at least one of the image UI 810 or the link UI 910 is hidden while vehicle is in motion.

Figure 10:
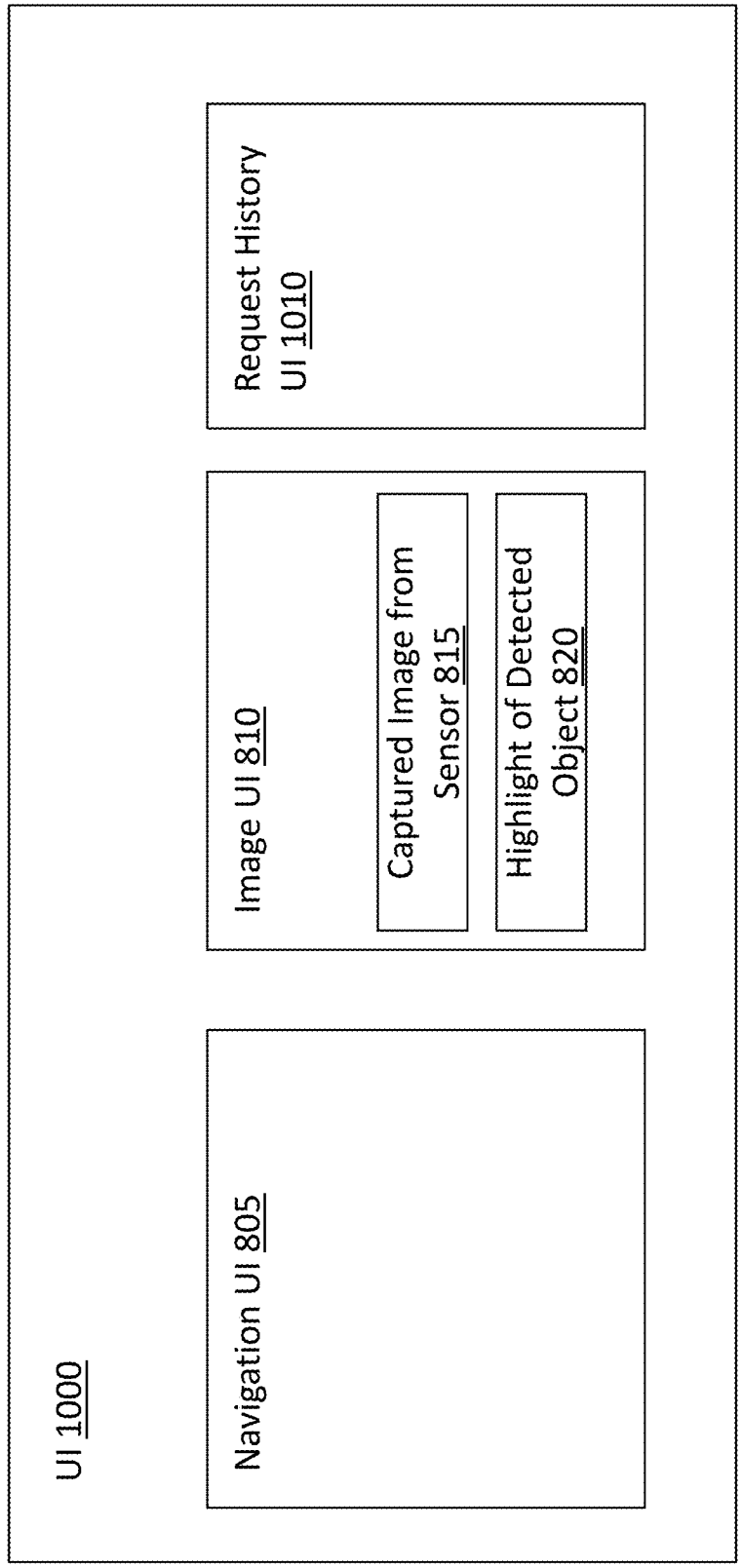
FIG. 10 is a view of a user interface in accordance with some embodiments.

FIG. 10 is a view of a user interface in accordance with some embodiments. In some embodiments, the UI 1000 corresponds to UI 116 (FIG. 1). In some embodiments, UI 1000 is part of mobile device 160 (FIG. 1). In some embodiments, UI 900 is part of vehicle system 110 (FIG. 1). The UI 1000 is similar to the UI 800. Components of the UI 1000 that are similar to the UI 800 have a same reference number. For the sake of brevity, only components of UI 1000 that are different from UI 800 are discussed below.

The UI 1000 includes a request history UI 1010 configured to display information related to the occupant request and any subsequent requests for additional information about the object. In some embodiments, the request history UI 1010 includes a dialog type display with the occupant request and object information provided in sequence. In some embodiments, the request history UI 1010 is configured to provide a selectable list of previous occupant requests; and display the information provided in response to a corresponding occupant request in response to selection of that occupant request. In some embodiments, the request history UI 1010 includes a touchscreen.

FIG. 10 includes the navigation UI 805 as being separate from the image UI 810 and the request history UI 1010. In some embodiments, at least one of the image UI 810 or the request history UI 1010 is overlaid on the navigation UI 805. In some embodiments, at least one of the image UI 810 or the request history UI 1010 is hidden while vehicle is in motion.

FIG. 11 is a block diagram of a system for implementing object identification in accordance with some embodiments. System 1100 includes a hardware processor 1102 and a non-transitory, computer readable storage medium 1104 encoded with, i.e., storing, the computer program code 1106, i.e., a set of executable instructions. Computer readable storage medium 1104 is also encoded with instructions 1107 for interfacing with external devices. The processor 1102 is electrically coupled to the computer readable storage medium 1104 via a bus 1108. The processor 1102 is also electrically coupled to an input/output (I/O) interface 1110 by bus 1108. A network interface 1112 is also electrically connected to the processor 1102 via bus 1108. Network interface 1112 is connected to a network 1114, so that processor 1102 and computer readable storage medium 1104 are capable of connecting to external elements via network 1114. The processor 1102 is configured to execute the computer program code 1106 encoded in the computer readable storage medium 1104 in order to cause system 1100 to be usable for performing a portion or all of the operations as described in object identification system 100 (FIG. 1), method 200 (FIG. 2) or method 300 (FIG. 3).

In some embodiments, the processor 1102 is a central processing unit (CPU), a multi-processor, a distributed processing system, an application specific integrated circuit (ASIC), and/or a suitable processing unit.

In some embodiments, the computer readable storage medium 1104 includes an electronic, magnetic, optical, electromagnetic, infrared, and/or a semiconductor system (or apparatus or device). For example, the computer readable storage medium 1104 includes a semiconductor or solid-state memory, a magnetic tape, a removable computer diskette, a random-access memory (RAM), a read-only memory (ROM), a rigid magnetic disk, and/or an optical disk. In some embodiments using optical disks, the computer readable storage medium 1104 includes a compact disk-read only memory (CD-ROM), a compact disk-read/write (CD-R/W), and/or a digital video disc (DVD).

In some embodiments, the storage medium 1104 stores the computer program code 1106 configured to cause system 1100 to perform a portion or all of the operations as described in object identification system 100 (FIG. 1), method 200 (FIG. 2) or method 300 (FIG. 3). In some embodiments, the storage medium 1104 also stores information needed for performing a portion or all of the operations as described in object identification system 100 (FIG. 1), method 200 (FIG. 2) or method 300 (FIG. 3) as well as information generated during performing a portion or all of the operations as described in object identification system 100 (FIG. 1), method 200 (FIG. 2) or method 300 (FIG. 3), such as a gaze data parameter 1116, an object data parameter 1118, a vehicle position parameter 1120, a request content parameter 1122, and/or a set of executable instructions to perform a portion or all of the operations as described in object identification system 100 (FIG. 1), method 200 (FIG. 2) or method 300 (FIG. 3).

In some embodiments, the storage medium 1104 stores instructions 1107 for interfacing with external devices. The instructions 1107 enable processor 1102 to generate instructions readable by the external devices to effectively implement a portion or all of the operations as described in object identification system 100 (FIG. 1), method 200 (FIG. 2) or method 300 (FIG. 3).

System 1100 includes I/O interface 1110. I/O interface 1110 is coupled to external circuitry. In some embodiments, I/O interface 1110 includes a keyboard, keypad, mouse, trackball, trackpad, and/or cursor direction keys for communicating information and commands to processor 1102.

System 1100 also includes network interface 1112 coupled to the processor 1102. Network interface 1112 allows system 1100 to communicate with network 1114, to which one or more other computer systems are connected. Network interface 1112 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in object identification system 100 (FIG. 1), method 200 (FIG. 2) or method 300 (FIG. 3) is implemented in two or more systems 1100, and information such as gaze data parameter 1116, object data parameter 1118, vehicle location parameter 1120, or request content parameter 1122 are exchanged between different systems 1100 via network 1114.

An aspect of this description relates to a method of obtaining object information. The method includes receiving a request initiation from an occupant of a vehicle. The method includes receiving a request from the occupant after receiving the request initiation. The method further includes determining a content of the request from the occupant. The method further includes detecting a gaze location of the occupant. The method further includes receiving information related to an environment surrounding the vehicle based on data collected by a sensor attached to the vehicle. The method further includes identifying a region of interest (ROI) outside of the vehicle based on the detected gaze location and the information related to the environment surrounding the vehicle. The method further includes generating log data based on the ROI and the content of the request. The method further includes transmitting the log data to an external device. The method further includes receiving information related to an object within the ROI, wherein the information satisfies the content of the request. In some embodiments, receiving the initiation request includes receiving the initiation request including a keyword, a key phrase, a predetermined gesture, or an input to a user interface (UI). In some embodiments, receiving information related to the environment surrounding the vehicle includes receiving an image from a camera attached to the vehicle. In some embodiments, the method further includes cropping the image based on the ROI, wherein generating the log data comprises generating the log data using the cropped image. In some embodiments, receiving information related to the object includes receiving identifying information related to the object in response to the content of the request being a request for identification of the object. In some embodiments, the method further includes determining an identity of the occupant, wherein generating the log data comprises generating the log data based on the identity of the occupant. In some embodiments, detecting the gaze location of the occupant includes detecting an azimuth angle of a gaze of the occupant relative to the vehicle, and detecting an elevation angle of the gaze of the occupation relative to the vehicle. In some embodiments, detecting the gaze location of the occupant further includes detecting a depth of the gaze of the occupant relative to the vehicle. In some embodiments, detecting the gaze location of the occupant includes detecting a world coordinate of the gaze location, and generating the log data comprises generating the log data based on the world coordinate. In some embodiments, detecting the gaze location of the occupant includes capturing an image of the occupant using a camera attached to the vehicle.

An aspect of this description relates to a system for obtaining object information. The system includes an occupant monitoring camera; a front camera; a non-transitory computer readable medium configured to store instructions thereon; and a processor connected to the non-transitory computer readable medium. The processor is configured to execute the instructions for receiving a request initiation from an occupant of a vehicle. The processor is further configured to execute the instructions for receiving a request from the occupant after receiving the request initiation. The processor is further configured to execute the instructions for determining a content of the request from the occupant. The processor is further configured to execute the instructions for detecting a gaze location of the occupant based on information from the occupant monitoring camera. The processor is further configured to execute the instructions for receiving information related to an environment surrounding the vehicle based on the front camera attached to the vehicle. The processor is further configured to execute the instructions for identifying a region of interest (ROI) outside of the vehicle based on the detected gaze location and the information related to the environment surrounding the vehicle. The processor is further configured to execute the instructions for generating log data based on the ROI and the content of the request. The processor is further configured to execute the instructions for generating instructions for transmitting the log data to an external device. The processor is further configured to execute the instructions for receiving information related to an object within the ROI, wherein the information satisfies the content of the request. In some embodiments, the processor is configured to execute the instructions for cropping an image from the front camera based on the ROI; and generating the log data using the cropped image. In some embodiments, the processor is configured to execute the instructions for receiving information related to the object comprising identifying information related to the object in response to the content of the request being a request for identification of the object. In some embodiments, the processor is configured to execute the instructions for determining an identity of the occupant; and generating the log data based on the identity of the occupant. In some embodiments, the processor is configured to execute the instructions for detecting an azimuth angle of a gaze of the occupant relative to the vehicle, and detecting an elevation angle of the gaze of the occupation relative to the vehicle. In some embodiments, the processor is configured to execute the instructions for detecting a depth of the gaze of the occupant relative to the vehicle. In some embodiments, the processor is configured to execute the instructions for detecting a world coordinate of the gaze location; and generating the log data based on the world coordinate.

An aspect of this description relates to a method of obtaining object information. The method includes receiving a request initiation from an occupant of a vehicle using a microphone. The method further includes receiving a request from the occupant after receiving the request initiation using the microphone. The method further includes detecting a gaze location of the occupant. The method further includes receiving information related to an environment surrounding the vehicle using a camera attached to the vehicle. The method further includes generating log data based on the information related to the environment surrounding the vehicle and the received request. The method further includes transmitting the log data to an external device. The method further includes receiving information related to an object within the environment surrounding the vehicle. The method further includes automatically generating a notification viewable by the occupant in response to receiving the information related to the object. In some embodiments, receiving information related to the object includes receiving a link for accessing the external device. In some embodiments, automatically generating the notification includes displaying the link on a user interface viewable by the occupant.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of obtaining object information, the method comprising:
    receiving, at a mobile device, a request initiation from an occupant of a vehicle, wherein the mobile device is separable from the vehicle;
    receiving, at the mobile device, a request from the occupant after receiving the request initiation;
    determining a content of the request from the occupant;
    detecting a gaze location of the occupant;
    receiving information related to an environment surrounding the vehicle based on data collected by a sensor attached to the vehicle;
    identifying a region of interest (ROI) outside of the vehicle based on the detected gaze location and the information related to the environment surrounding the vehicle;
    determining a location of the vehicle;
    generating log data based on the ROI, the location of the vehicle, and the content of the request;
    transmitting the log data to an external device;
    receiving, from the external device, information related to an object within the ROI, wherein the information satisfies the content of the request; and
    generating the log data comprises generating the log data using a processor mounted in the vehicle.

2. The method according to claim 1, wherein receiving the initiation request comprises receiving the initiation request including a keyword, a key phrase, a predetermined gesture, or an input to a user interface (UI).

3. The method according to claim 1, wherein receiving information related to the environment surrounding the vehicle comprises receiving an image from a camera attached to the vehicle.

4. The method according to claim 3, further comprising:
    cropping the image based on the ROI, wherein generating the log data comprises generating the log data using the cropped image.

5. The method according to claim 1, wherein receiving information related to the object comprises receiving identifying information related to the object in response to the content of the request being a request for identification of the object.

6. The method according to claim 1, further comprising:
    determining an identity of the occupant, wherein generating the log data comprises generating the log data based on the identity of the occupant; and
    setting a priority of the log data based on the identity of the occupant.

7. The method according to claim 1, wherein detecting the gaze location of the occupant comprises:
    detecting an azimuth angle of a gaze of the occupant relative to the vehicle, and
    detecting an elevation angle of the gaze of the occupation relative to the vehicle.

8. The method according to claim 7, wherein detecting the gaze location of the occupant further comprises:
    detecting a depth of the gaze of the occupant relative to the vehicle.

9. The method according to claim 1, wherein detecting the gaze location of the occupant comprises detecting a world coordinate of the gaze location, and generating the log data comprises generating the log data based on the world coordinate.

10. The method according to claim 1, wherein the external device is different from the mobile device.

11. A system for obtaining object information, the system comprising:
a mobile device, wherein the mobile device is configured to
receive a request initiation from an occupant of a vehicle, and
receive a request from the occupant after receiving the request initiation, wherein
the mobile device is separable from the vehicle;
an occupant monitoring camera;
a front camera;
a non-transitory computer readable medium configured to store instructions thereon; and
a processor connected to the non-transitory computer readable medium, wherein the processor is mounted in the vehicle, and the processor is configured to execute the instructions for:
determining a content of the request from the occupant;
detecting a gaze location of the occupant based on information from the occupant monitoring camera;
receiving information related to an environment surrounding the vehicle based on the front camera attached to the vehicle;
identifying a region of interest (ROI) outside of the vehicle based on the detected gaze location and the information related to the environment surrounding the vehicle;
determining a location of the vehicle;
generating log data based on the ROI, the location of the vehicle, and the content of the request;
generating instructions for transmitting the log data to an external device; and
receiving, from the external device, information related to an object within the ROI, wherein the information satisfies the content of the request.

12. The system according to claim 11, wherein the processor is configured to execute the instructions for:
cropping an image from the front camera based on the ROI; and
generating the log data using the cropped image.

13. The system according to claim 11, wherein the processor is configured to execute the instructions for:
receiving information related to the object comprising identifying information related to the object in response to the content of the request being a request for identification of the object.

14. The system according to claim 11, wherein the processor is configured to execute the instructions for:
determining an identity of the occupant;
setting a priority of the log data based on the identity of the occupant; and
generating the log data based on the identity of the occupant.

15. The system according to claim 11, wherein the processor is configured to execute the instructions for:
detecting an azimuth angle of a gaze of the occupant relative to the vehicle, and
detecting an elevation angle of the gaze of the occupation relative to the vehicle.

16. The system according to claim 15, wherein the processor is configured to execute the instructions for:
detecting a depth of the gaze of the occupant relative to the vehicle.

17. The system according to claim 11, wherein the processor is configured to execute the instructions for:
detecting a world coordinate of the gaze location; and
generating the log data based on the world coordinate.

18. A method of obtaining object information, the method comprising:
receiving a request initiation, at a mobile device, from an occupant of a vehicle using a microphone, wherein the mobile device is separable from the vehicle;
receiving a request, at the mobile device, from the occupant after receiving the request initiation using the microphone;
detecting a gaze location of the occupant;
receiving information related to an environment surrounding the vehicle using a camera attached to the vehicle, wherein the information related to the environment surrounding the vehicle comprises a region of interest (ROI);
determining a location of the vehicle;
generating log data based on the information related to the environment surrounding the vehicle, the location of the vehicle, and the received request;
transmitting the log data to an external device;
receiving, from the external device, information related to an object within the environment surrounding the vehicle;
automatically generating a notification viewable by the occupant in response to receiving the information related to the object; and
generating the log data comprises generating the log data using a processor mounted in the vehicle.

19. The method according to claim 18, wherein receiving information related to the object comprises receiving a link for accessing the external device, wherein the external device is different from the mobile device.

20. The method according to claim 19, wherein automatically generating the notification comprises displaying the link on a user interface viewable by the occupant.

* * * * *